(12) United States Patent
Smith et al.

(10) Patent No.: US 9,497,122 B2
(45) Date of Patent: *Nov. 15, 2016

(54) SYSTEM AND METHODS FOR IDENTIFYING AND REMEDYING TRAFFIC IMBALANCES AND INEQUITIES BETWEEN NETWORKS

(71) Applicant: Level 3 Communications, LLC, Broomfield, CO (US)

(72) Inventors: Barbara Smith, Brighton, CO (US); Erik Sear, Denver, CO (US); David R. Siegel, Niwot, CO (US); Jonathan Callahan, Lakewood, CO (US); John Kane, Longmont, CO (US); Mark Taylor, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 375 days.

This patent is subject to a terminal disclaimer.

(21) Appl. No.: 13/913,062

(22) Filed: Jun. 7, 2013

(65) Prior Publication Data

US 2013/0275587 A1  Oct. 17, 2013

Related U.S. Application Data

(63) Continuation-in-part of application No. 13/683,903, filed on Nov. 21, 2012, now Pat. No. 9,054,981.

(60) Provisional application No. 61/594,814, filed on Feb. 3, 2012, provisional application No. 61/657,535, filed on Jun. 8, 2012.

(51) Int. Cl.
*G06F 15/173* (2006.01)
*H04L 12/803* (2013.01)
*H04L 12/54* (2013.01)
*H04L 12/26* (2006.01)
*H04L 12/751* (2013.01)

(52) U.S. Cl.
CPC ......... *H04L 47/125* (2013.01); *H04L 12/5691* (2013.01); *H04L 43/0888* (2013.01); *H04L 45/02* (2013.01)

(58) Field of Classification Search
USPC .................. 709/223, 224, 226, 227, 229
See application file for complete search history.

(56) References Cited

U.S. PATENT DOCUMENTS 7,554,930 B2    6/2009    Gaddis et al.
7,764,628 B2    7/2010    Gerber et al.
(Continued)

FOREIGN PATENT DOCUMENTS

WO    WO-2010088622    8/2010

OTHER PUBLICATIONS

Extended European Search Report, dated Jul. 20, 2015, Application No. 13743075.7, filed Feb. 1, 2013; 8 pgs.
(Continued)

*Primary Examiner* — Liangche A Wang

(57) ABSTRACT

Implementations described and claimed herein providing systems and methods for modeling and visualizing interconnection relationships between a first provider network and a partner. In one implementation, a partner of a provider network is defined by at least one interconnection point where network traffic may be exchanged between the provider network and the partner. An interconnection relationship is generated based on the at least one interconnection point. The interconnection relationship is modeled.

16 Claims, 16 Drawing Sheets

(56) References Cited

U.S. PATENT DOCUMENTS

| | | | |
|---|---|---|---|
| 7,953,888 B2* | 5/2011 | Ricciulli | 709/239 |
| 8,175,006 B2 | 5/2012 | Lee et al. | |
| 2002/0055989 A1* | 5/2002 | Stringer-Calvert et al. | 709/220 |
| 2008/0279222 A1 | 11/2008 | Fuller et al. | |
| 2009/0129580 A1* | 5/2009 | Terpstra et al. | 379/232 |
| 2009/0185486 A1 | 7/2009 | Gerber et al. | |
| 2010/0003030 A1* | 1/2010 | Gilfedder et al. | 398/67 |
| 2010/0142543 A1* | 6/2010 | Shaikh et al. | 370/401 |
| 2011/0069634 A1 | 3/2011 | Hajiaghayi et al. | |
| 2011/0122932 A1* | 5/2011 | Lovberg et al. | 375/219 |
| 2011/0307899 A1* | 12/2011 | Lee et al. | 718/104 |
| 2013/0205029 A1 | 8/2013 | Taylor et al. | |
| 2013/0282897 A1 | 10/2013 | Siegel et al. | |

OTHER PUBLICATIONS

International Search Report, dated Aug. 15, 2013, Int'l Appl. No. PCT/US13/044816, Int'l Filing date Jun. 7, 2013; 3 pgs.

International Search Report, dated Aug. 23, 2013, Int'l Appl. No. PCT/US13/045978, Int'l Filing Date Jun. 14, 2013; 3 pgs.

Written Opinion of the International Search Authority, dated Aug. 15, 2013, Int'l Appl. No. PCT/US13/044816, Int'l Filing Date Jun. 8, 2013; 4 pgs.

Written Opinion of the International Searching Authority, dated Aug. 23, 2013, Int'l Appl. No. PCT/US13/045978, Int'l Filing Date Jun. 14, 2013; 5 pgs.

International Preliminary Report on Patentability, dated Dec. 16, 2015, Int'l Appl. No. PCT/US13/045978, Int'l Filing Date Jun. 14, 2013; 7 pgs.

International Search Report, dated Apr. 19, 2013, Int'l Appl. No. PCT/US13/024375, Int'l Filing Date Feb. 1, 2013, 3 pgs.

Written Opinion of the International Searching Authority, dated Apr. 19, 2013, Int'l Appl. No. PCT/US13/024375, Int'l Filing Date Feb. 1, 2013, 6 pgs.

International Preliminary Report on Patentability, dated Aug. 5, 2014, Int'l Application No. PCT/US13/024375, Int'l Filing Date Feb. 1, 2013; 8 pgs.

Extended European Search Report, dated Dec. 7, 2015, Application No. 13801396.6, filed Jun. 7, 2013; 9 pgs.

Extended European Search Report, dated Feb. 24, 2016, Application No. 13803718.9, filed Jun. 14, 2013; 9 pgs.

* cited by examiner

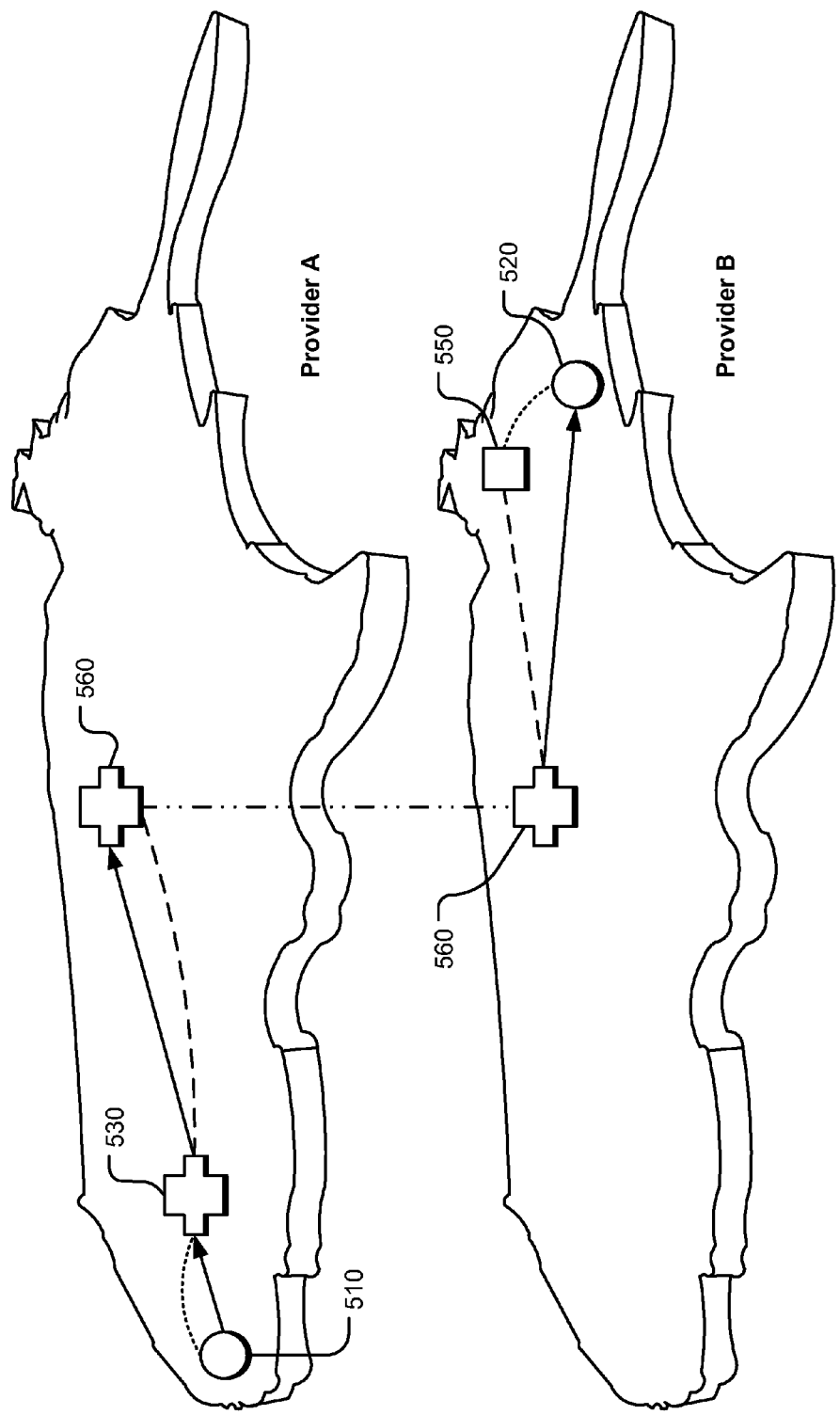

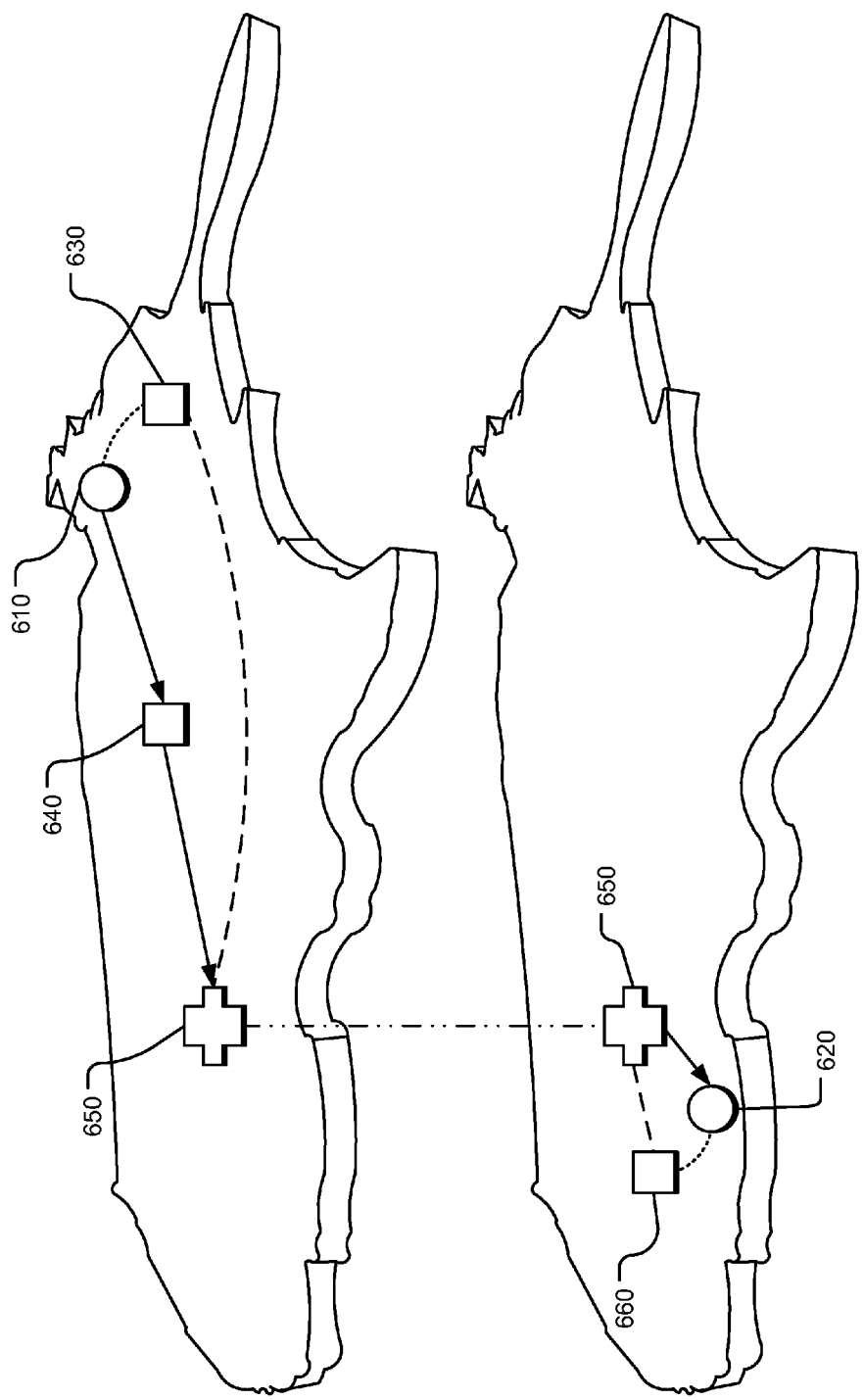

US 9,497,122 B2

SYSTEM AND METHODS FOR IDENTIFYING AND REMEDYING TRAFFIC IMBALANCES AND INEQUITIES BETWEEN NETWORKS

CROSS-REFERENCE TO RELATED APPLICATION

The present application is a continuation-in-part of U.S. patent application Ser. No. 13/683,903, entitled "System and Methods for Identifying and Remedying Traffic Imbalances and Inequities between Networks" and filed on Nov. 21, 2012, which claims benefit under 35 U.S.C. §119(e) to U.S. Provisional Patent Application No. 61/594,814, entitled "System and Methods for Identifying and Remedying Traffic Imbalances and Inequities between Networks" and filed on Feb. 3, 2012.

The present application claims benefit under 35 U.S.C. §119(e) to U.S. Provisional Patent Application No. 61/657,535, entitled "Visualization and Modeling Tool for a System of Identifying and Remedying Traffic Imbalances and Inequities between Networks" and filed on Jun. 8, 2012. Each of these applications is specifically incorporated by reference herein for all that it discloses or teaches.

TECHNICAL FIELD

Aspects of the present disclosure relate to communication networks, and in particular, methods and systems for visualizing and modeling traffic exchanges and imbalances between networks, and particularly for backbone imbalances between provider networks carrying Internet traffic.

BACKGROUND

Large Internet Service Providers (ISPs) maintain their own networks with backbones stretching from coast to coast. Because no single major ISP controls the market, it is beneficial for the major ISPs to interconnect their networks so that users perceive that they are interacting with a single, transparent network. Typically, the interconnections are based on a combination of public multi-access facilities (e.g., MAE-EAST, MAE-WEST) and private point-to-point connections between routers controlled by distinct providers. However, the difference in cost borne by each of the ISPs may be so high that it is not in the interest of an ISP to interconnect at high speed with another ISP. For example, one ISP may bear greater costs where network traffic loads across distinct ISPs are asymmetric resulting in a greater bandwidth use on one network and/or where one ISP carries network traffic over a greater distance. Further, the path within an ISP is often not visible, shortest path, or symmetrical, making it difficult for a partner of the ISP to properly assess.

It is with these observations in mind, among others, that various aspects of the present disclosure were conceived and developed.

SUMMARY

Implementations described and claimed herein address the foregoing problems by providing systems and methods for modeling and visualizing interconnection relationships between a first provider network and a partner. In one implementation, a partner of a provider network is defined by at least one interconnection point where network traffic may be exchanged between the provider network and the partner. An interconnection relationship is generated based on the at least one interconnection point. The interconnection relationship is modeled.

Other implementations are also described and recited herein.

BRIEF DESCRIPTION OF THE DRAWINGS

Example implementations are illustrated in referenced figures of the drawings. It is intended that the implementations and figures disclosed herein are to be considered illustrative rather than limiting.

FIGS. 5A and 5B illustrate an example network architecture implementing multi-exit discriminators to remedy a load imbalance between two providers.

FIGS. 6A and 6B illustrate an example network architecture interconnecting two providers at a mutual potential interconnection to remedy a load imbalance between the providers.

DETAILED DESCRIPTION

Figure 1:
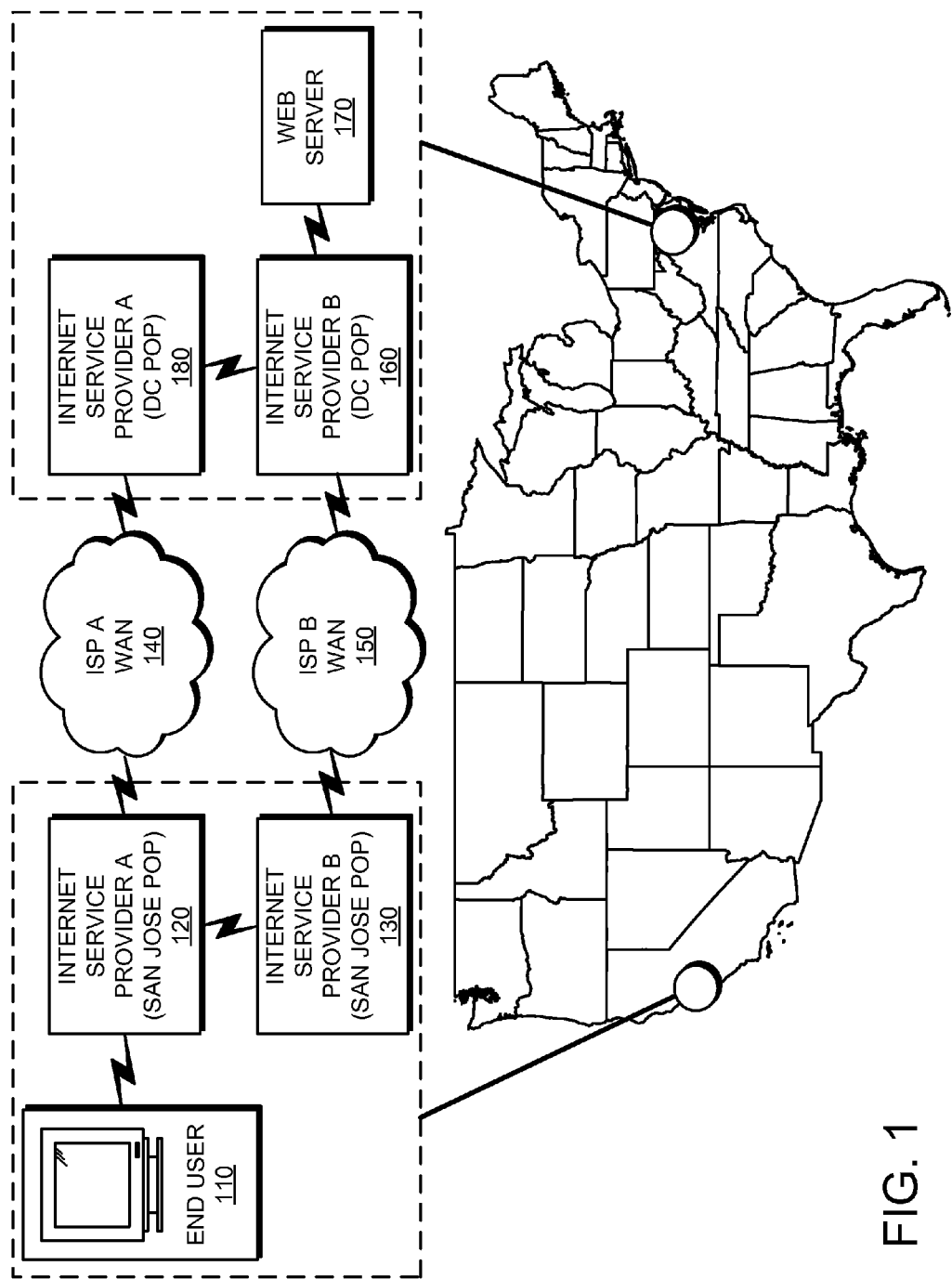
FIG. 1 is an example network architecture connecting two national ISPs.

Aspects of the present disclosure involve peering principals and associated systems and methodologies to remedy network load imbalances between interconnected provider networks. In one aspect, a bandwidth and a distance of network traffic is measured for each of the provider networks. The measurement may be in the form of a bit mile measurement. Specifically, bit miles for each provider network are measured between a provider edge (PE) port, where traffic ingresses from or egresses to a third party, and an interconnection point, where the traffic is handed off to another provider network. In other words, bit miles for each provider are obtained, measured, or otherwise calculated as a function of an amount of traffic bandwidth between the PE port and the interconnection point and a geographical distance between the interconnection point and a potential interconnection point or an interconnection point assigned to the PE port using PE port mapping. In one implementation, PE port mapping is the process of assigning an interconnection point or a potential interconnection point, whichever is geographically closest, to each PE port for the purpose of measuring the distance traffic is carried. The bit miles are measured between each relevant location, and the total measured bit miles for a provider network is the sum of all measured bit miles. Bit mile information for each provider network may be exchanged to identify load imbalances between the provider networks. Variously remedies, including, but not limited to, payments, multi-exit discriminators, mutual potential interconnection points, and other remedies, may be implemented to roughly balance the bit miles between the provider networks.

Aspects of the present disclosure further involve a visualization and modeling tool enabling a user to model interconnection relationships between a provider network and a partner, which may also be a provider network. Using the visualization and modeling tool, a user may visualize or otherwise assess the impact of at least one interconnection point on the exchange of network traffic between a provider network and a partner. As such, the visualization and modeling tool may be used, for example, to define possible network load imbalance remedies and model the remedies before physical implementation to visualize the impact of the remedies on the balance of bit miles between provider networks.

In one implementation, provider networks exchange Internet traffic using the border gateway protocol ("BGP"). BGP is a telecommunications industry standard for an inter-autonomous system routing protocol (i.e., a connected group of one or more IP prefixes run by one or more network operators which has a single and clearly defined routing policy), including support for both route aggregation and Classless Inter Domain Routing (CIDR) between the provider's Internet networks at one or more interconnection points. As discussed herein, the term Internet network refers to an Internet protocol network that includes interconnection points utilizing BGP to govern the exchange of Internet traffic at the interconnection points. In one particular example referring to providers with Internet networks in the United States, the term Internet network may further involve a backbone network node in at least seven of the nine U.S. Census Bureau Divisions. The nine divisions of the United States are generally described as New England, Middle Atlantic, South Atlantic, East South Central, East North Central, West North Central, West South Central, Mountain, and Pacific. A provider's Internet network may involve one or more of several such communications networks operated by the provider or by entities related to the provider, each of which may have its own autonomous system number, but all of which are directly or indirectly connected and collectively connected to the interconnection points.

An interconnection point is any location where providers exchange Internet traffic (i.e., network traffic regardless of the source, destination, or technology used to deliver the traffic (including IPv4 and IPv6 Internet traffic)) between the providers' Internet networks. Again, referring to a United States based example, the initial interconnection points may be in at least six of the nine U.S. Census Bureau Divisions and may include at least one city on the east coast, one in the central region, and one on the west coast.

Traffic delivered from a customer of an ISP to a destination that is not on the ISP's network traverses an end-to-end path that includes three segments: (1) a segment from the ISP's customer through the ISP's network; (2) a segment represented by the interconnection point between the ISP and a target ISP that serves the destination; and (3) a segment across the target ISP to the destination. To reduce congestion, it is often desirable to build both a network and a service model that reduces bottlenecks on all three of these path segments.

An ISP may only have direct control over bandwidth in the first segment, while being dependent on the target ISP partially with respect to the second segment and entirely with respect to the third segment. An ISP may reduce these dependencies by implementing a "local delivery" or "best exit"-like service model that engineers end-to-end paths utilizing the ISP's own network as much as possible.

Traffic between one ISP and another ISP may be exchanged in what is known as "shortest-exit" manner. Under a "shortest exit" exchange, traffic originating from one ISP's customer (the source) that is destined for another ISP's customer (the destination) is sent toward the topologically closest interconnection point between the source and the destination. Where the source and destination are not geographically or topologically close to each other, the result tends to be higher costs borne by the destination's ISP. If a first ISP has only large content sites as customers and a second ISP provides only connectivity to content consumers, the cost differences may be so high that it is not in the interest of the second ISP to interconnect at high speed with the first ISP.

For example, consider traffic sent by a customer, whose content is hosted in a data center in San Jose, Calif. by the "ABC" ISP, across the "XYZ" ISP to a destination located in Washington, D.C. Assuming that ABC and XYZ can exchange traffic in two locations: one near San Jose, Calif. and the other near Washington, D.C., network traffic flows as follows: (1) a Washington, D.C.-based customer of XYZ sends a request a short distance across the XYZ network to the interconnection point near Washington, D.C.; (2) the request enters the ABC network near Washington, D.C. and is carried a long distance across the ABC network to the San Jose data center; (3) a reply is created by the content server in the San Jose data center and is sent a short distance across the ABC network to the nearest interconnection point near San Jose; and (4) the reply is carried a long distance across the XYZ network from the San Jose area to the customer in the Washington, D.C. area. The traffic flow is asymmetric, with the ABC network carrying the majority of the content request and the XYZ network carrying the majority of the content reply. Because content replies are typically far larger than content requests, often, by many orders of magnitude (for example, a 100-or-so-byte request can easily result in a multi-megabyte JPG image being returned), the result is greater bandwidth use on the XYZ network and thus greater cost to its ISP. Such traffic imbalances and asymmetric routing is illustrated in FIGS. 1 and 2.

Referring to FIG. 1, which is an example network architecture connecting two national ISPs, an end user 110 located near San Jose, Calif., may connect to the Internet through an ISP "A" San Jose point-of-presence (POP) 120. ISP A also may provide interconnections to one or more other networks, for example, an ISP B San Jose POP 130. In addition to interconnections with other providers, ISP A may maintain a wide area network (WAN) 140 to provide connections between various POPs of ISP A that are distributed across the country. In FIG. 1, ISP A WAN 140 and ISP B WAN 150 interconnect San Jose and Washington, D.C. POPs. ISP B DC POP 160 provides a network connection for a web server 170 as well as an interconnection with ISP A DC POP 180. The network architecture shown in FIG. 1 is a simple example of a network architecture connecting two national ISPs. Other, far more complex implementations are contemplated.

Figure 2:
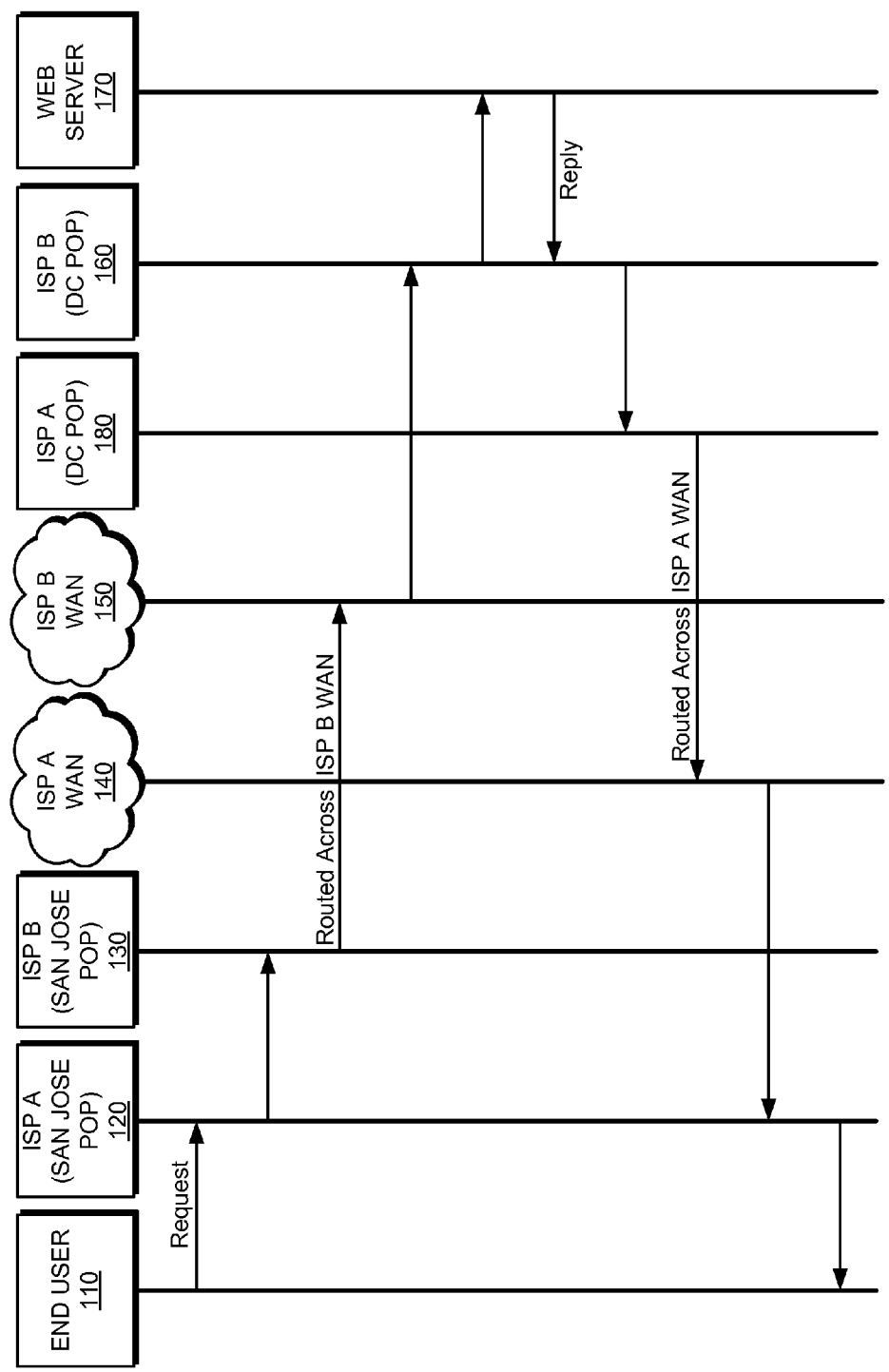
FIG. 2 is a diagram illustrating traffic imbalances and otherwise illustrating asymmetric routing which may result in traffic imbalances.

FIG. 2 is a diagram illustrating traffic imbalances and otherwise illustrating asymmetric routing which may result in traffic imbalances. As shown in FIG. 2, packets sent between the end-user 110 and the web server 170 are often routed asymmetrically. In other words, packets sent from the end user 110 to the web server 170 may take a different path than packets returned from the web server 170 to the end user 110. For example, if the end user 110 requests a web page from the web server 170, the request is routed through ISP A San Jose POP 120. Routers at the San Jose POP maintain routing tables describing how to route packets based on the destination address. To simplify routing table information, networks are typically aggregated. For example, ISP B may be assigned the network address 192.168.x.x. The subnet address 192.168.1.x may be selected for the ISP B DC POP 160 while 192.168.2.x may be selected for the ISP B San Jose POP 130. Instead of advertising routes to both 192.168.1.x through Washington, D.C. and 192.168.2.x through San Jose, the routes likely will be aggregated so that both POPs 130 and 160 advertise a single 192.168.x.x route, thus decreasing the size of routing tables that must be maintained.

Because the ISP B San Jose POP 130 advertises routes to ISP B DC POP 160 networks, the ISP A San Jose POP 120 routes a request from the end user 110 to the web server 170 through the ISP B San Jose POP 130. The request travels across ISP B WAN 150 to the ISP B DC POP 160 and then to web server 170.

A reply sent from the web server 170 to the end user 110 will likely take a different route, as illustrated in FIG. 2. Because the ISP A DC POP 180 advertises a route to the network used by the end user 110, packets are routed from the web server 170 through the ISP B DC POP 160 to the ISP ADC POP 180. Then, the reply travels across ISP A WAN 140 to the ISP A San Jose POP 120 to the end user 110.

Packets sent from the end user 110 to the web server 170 travel most of the distance across ISP B WAN 150, and packets sent the other direction travel most of the distance across ISP A WAN 140. As discussed above, the reply is often larger than the request. Thus, ISPs supporting large numbers of end users (e.g., ISPs selling directly to consumers) end up carrying a greater portion of transmitted information than ISPs supporting mostly information suppliers (e.g., ISPs engaged in server co-location and web hosting). Connecting customers that are large traffic sources to POPs that are not close to the interconnection points may trigger a need for additional backbone capacity.

Costs of interconnection can be reduced by keeping traffic sources topologically close to the points where connections to other ISPs are located, because the bulk of traffic originating at those sources is usually headed toward destinations on other ISPs' networks. Keeping the sources close to the exit points reduces the number of links on the backbone that the traffic must cross and therefore reduces the cost of transporting the traffic. Traffic exchange arrangements between ISPs typically have been based on three principles. First, networks are interconnected at multiple, geographically-diverse points, typically including at least one point on the east coast and one point on the west coast, in the case of the United States. Second, routing information exchanged at the interconnection points should be identical. Third, network traffic is routed using a "closest-exit" or "hot-potato" approach (i.e., traffic is routed through the topologically-closest exit point on the source ISP's network).

These arrangements place the bulk of the burden of distributing traffic across long distances on the receiver of the traffic. An ISP may have a different cost structure from a distinct ISP for a variety of reasons. For example, ISPs which are sources of data (i.e., which house large web farms) tend to have much lower costs associated with interconnection than those that connect large numbers of data consumers (i.e., those with lots of dialups or other end-users) because, on average, they carry traffic much shorter distances.

The "closest-exit" cost model is easy to implement and reasonably fair, as long as the providers involved are of approximately the same size, exchange roughly the same amount of traffic in each direction, assume comparable costs, and derive comparable benefits from the interconnection arrangement. As the Internet has grown and the market has become somewhat divided into data producers (principally, web-hosting) and consumers (those which connect end-users), the larger ISPs are recognizing that being on the receiving side of a traffic imbalance drives up costs without increasing revenue. The result is that larger ISPs resist establishing or expanding interconnections with large data sources.

Figure 3:
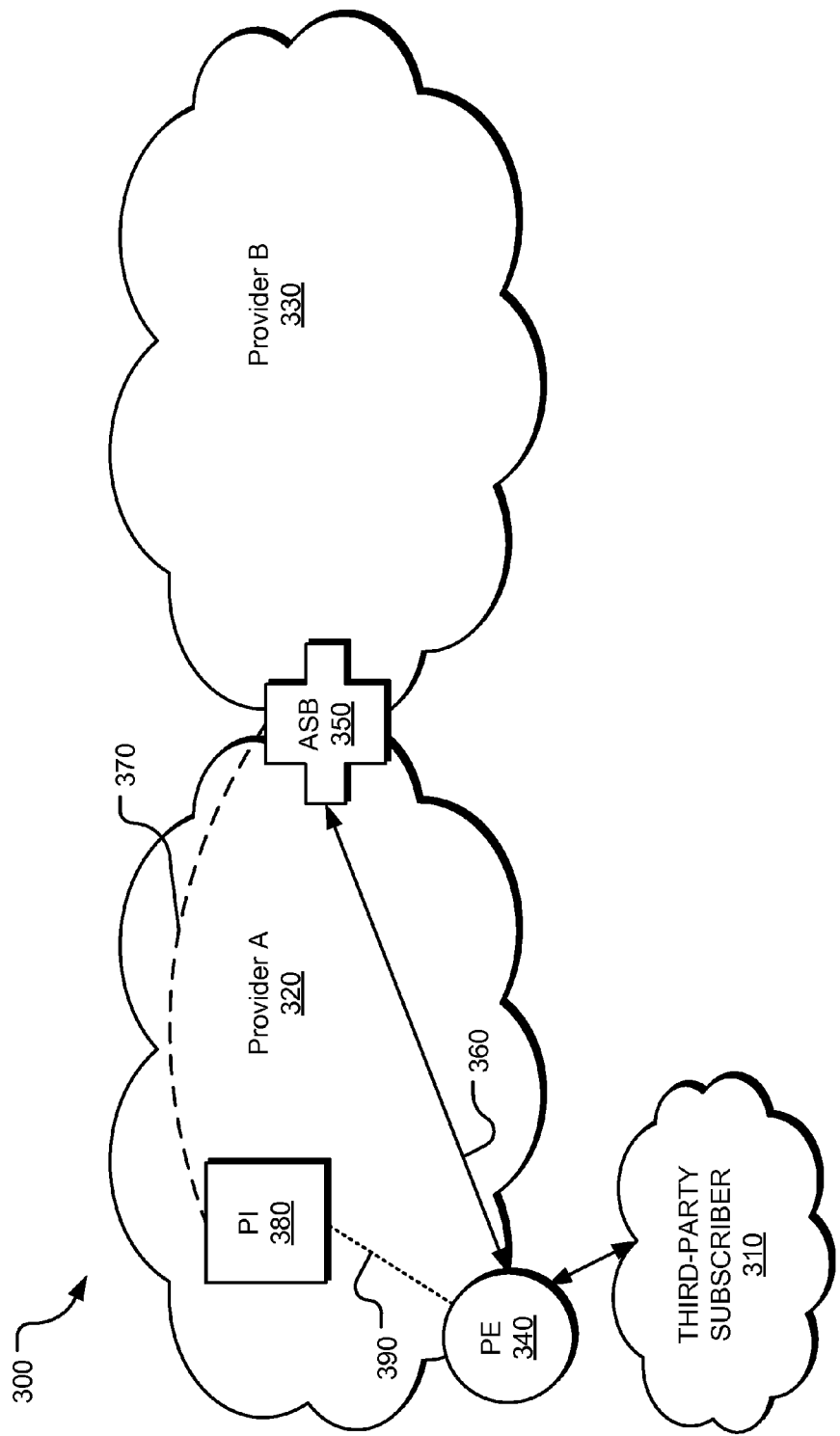
FIG. 3 shows example network architecture for identifying and remedying traffic or other load imbalances between networks.

FIG. 3 is an example network architecture 300 for identifying and remedying traffic or other load imbalances between networks. It should be understood that the network architecture shown in FIG. 3 is for illustrative purposes, and other more complex implementations could and would very likely be provided. As shown in FIG. 3, in an example implementation, a third-party network 310 connects to a first provider network, Provider 320, which is configured to exchange network traffic with a second provider network, Provider 330.

Generally speaking, neither Provider 320 nor Provider 330 is configured to restrict Internet traffic flowing through interconnection points from the other provider network based on the content, type, or subject matter of the traffic being exchanged, with some exceptions. Although, Provider 320 and Provider 330 may be configured with various conventional security measures. Moreover, Provider 320 and Provider 330 may route and exchange Internet traffic using third-party networks, data, and content sources. In a representative example, Provider 320 and Provider 330 each include a fully redundant backbone network, in which the majority of inter-hub trunking links have a capacity of 9953 Mbps (OC-192). Moreover, Provider 320 and Provider 330 each maintain a NOC and a communicated escalation schedule. A NOC is a fully staffed network operations center that operates on a 24 hours/day, 7 days/week basis. Provider 320 and Provider 330 each register routes, routing domains, and routing policies of their respective public Internet subscribers in a public Internet Routing Registry. Further, Provider 320 and Provider 330 implement configuration changes to match changes in Internet Routing Registry policy. Finally, Provider 320 and Provider 330 typically will maintain a consistent routing announcement. Thus, Provider 320 and Provider 330 present the same Autonomous System number at all interconnection points, except in circumstances when such is technically difficult, not possible, or otherwise not advisable.

To remedy imbalances in network traffic carried between Provider 320 and Provider 330, each provider only announces routes for paid traffic exchanged with their customers, and one or both of Provider 320 and Provider 330 may not advertise routes restricted to only the other provider. Notwithstanding, Provider 320 sending traffic to Provider 330 may send traffic only to the routes announced by Provider 330 pursuant to the load inequity balancing methodologies and systems set out herein, for example.

Provider 320 and Provider 330 may be configured in various ways to remedy load imbalances and other inequities. For example, neither Provider 320 nor Provider 330 may be configured with a route of last resort directed toward the other. Moreover, Provider 320 and Provider 330 may fully exchange explicit routes comprising public Internet service destinations of entities to which either Provider 320 or Provider 330 is obligated to handle traffic. In one particular implementation, all route announcements between Provider 320 and Provider 330 are filtered by prefix. Further, Provider 320 and Provider 330 may each be required to disclose all routes on its Internet Network through routeviews.oregon-ix.org or a similar site. Finally, Provider 320 and Provider 330 may each be configured so as not to forward traffic for destinations not explicitly advertised, reset next-hop, or providing next-hop to other networks.

With ever increasing traffic, in one example, the interconnection points between Provider 320 and Provider 330 are monitored for actual carried capacity relative to the available capacity. Further, when the circuit utilization (an example of actual capacity) exceeds a capacity threshold (e.g., 70% for four or more consecutive hours on five or more consecutive days), then an alert or some other form of notice is generated. The notice may then prompt an augmentation of the interconnection point by either or both of Provider 320 and Provider 330.

To identify and remedy a traffic or other load imbalance and thereby equitably share backbone costs and burdens, the methods and systems set out herein involve a measurement of the both the bandwidth and distance of Internet traffic handled by one or both of Provider 320 and Provider 330. In one particular example, the measurement is the form of a bit mile measurement and may also take into account potential interconnection points of a virtual provider network, as described below.

In one implementation, the network architecture 300 includes at least one provider edge port (PE port) 340, at least one Autonomous System Border Port (ASB port) 350, and at least one a potential interconnection (PI point) 380. A PE port is a port that connects a provider network with a network administered by a third-party network provider, which is typically an ISP. For example, as shown in FIG. 3, the PE port 340 connects the third-party network 310 with Provider 320. An ASB port or "Autonomous System Border Port" is a port on one provider network's Internet network, running external BGP, that is connected (may be directly connected) to the Internet network of another provider network. For example, in FIG. 3, the ASB port 350 is located at an interconnection point where network traffic is exchanged between Provider 320 and Provider 330. A PI point is a location where a provider network may be configured to exchange traffic with another provider network. For example, as shown in FIG. 3, the PI point 380 is a location that Provider 320 may make available as an interconnection point to exchange traffic with Provider 330.

Provider 320 and Provider 330 each include network intelligence tools, including PE port mapping, to accurately measure bit miles (and all elements thereof) for all Internet traffic exchanged over interconnection points. Moreover, Provider 320 and Provider 330 each include network management systems that enable the equitable balancing of bit miles across Provider 320 and Provider 330 in accordance with the remedies set out herein. Further, in some implementations, Provider 320 and Provider 330 can implement and support multi-exit discriminators (MEDs). For example, if Provider 320 is advertising MEDs, Provider 320 would be required to prefer Internet traffic routes to the interconnection point that is the closest to the egress PE Port for Internet traffic at each of the PI Points and ASB Ports of Provider 320.

As can be understood from FIG. 3, bit miles for Provider 320 are measured between the PE port 340, where Internet traffic ingresses Provider 320 from the third-party network 310, and the ASB port 350, where part of that traffic was handed off to Provider 330. Bit miles for Provider 320 are then obtained or calculated as the product of (i) an amount of traffic bandwidth 360 from the PE port 340 to the ASB port 350 and (ii) a geographical distance 370 between the ASB port 350 and the PI point 380 or an ASB port assigned to the PE port 340 using PE port mapping. Provider 320 may only count miles if Provider 330 has an opportunity to interconnect in new locations (e.g., PI points) to carry traffic that would otherwise be imbalanced. Miles between a PE port and the PI point or ASB port assigned to the PE port using PE port mapping (e.g., PE port mapping 390) are not counted in the bit miles measurement or calculation.

In one implementation, the amount of traffic bandwidth 360 may be measured using a $95^{th}$ Percentile Method, which is a traffic measurement technique whereby bandwidth usage is sampled every 5 minutes over a calendar month, the top 5% of such samples are discarded, and the next highest $95^{th}$ percentile measurement is used. However, it will be appreciated by those of ordinary skill that other traffic measurement techniques may be utilized to determine the amount of traffic bandwidth 360.

The geographical distance 370 is measured between the ASB port 350 and the geographically closest of a PI point or an ASB port assigned to the PE port 340 using PE port mapping. In the example implementation shown in FIG. 3, the PI point 380 is assigned to the PE port 340 using PE port mapping 390. The PI point 380 is a location that may become an interconnection point to remedy inequities, particularly in backbone traffic, as identified using bit mile measurements. Thus, a virtual network representative of Provider 320 may be established with the PI point 380, as well as interconnection points, including the ASB port 350, and third party network ingress ports, such as the PE port 340.

In some implementations, the PI point 380 is defined using at least three criteria. First, the PI point 380 is restricted to a point at which a customer or other network provider of Provider 320, such as the third-party network 310, can interconnect at least at 10 GE scale using BGP sessions, or as otherwise specified, and where exchanged traffic would not be less than 3 Gbps, or some other bandwidth, on a monthly basis. The exchanged traffic may be measured using the $95^{th}$ Percentile Method and aggregating the traffic of all PE ports that would be mapped to the PI point 380 if implemented, in this case the PE port 340. Second, the PI point 380 is not closer than 50 miles, or some other distance, to any other PI Point or ASB Port, such as the ASB port 350, on the Internet Network of Provider 320. Third, the PI point 380 is either: (a) served on net by at least three competitive providers of communications service; or (b) allowed, at the election of Provider 330, to be placed on net by Provider 330 (i.e., by allowing Provider 330 to access the PI point 380 via fiber or other connectivity, without charge) or to be accessed at various times via lit services provided by Provider 320 at commercially reasonable rates for the relevant metropolitan statistical area.

The geographical distance 370 may be measured using various measures of geographical distance. For example, in one implementation, the geographical distance 370 is measured using "Great Circle Miles," which is calculated based on the following equation, where $lat_a$, $lon_a$; $lat_b$, $lon_b$ are the geographical latitude and longitude of the two locations a and b, measured in radians, and 3963 represents the radius of the Earth measured in miles:

$$GreatCircleMiles = 3963 \times arccos\ [\sin(lat_a)\sin(lat_b) + \cos(lat_a)\cos(lat_b)\cos(lon_b - lon_a)]$$

As an example, if the amount of traffic bandwidth between the PE port 340 and the ASB port 350 is measured at 1 Mbps during a month and the Great Circle Miles between the PI point 380 and the ASB port 350 is 500 miles, the Measured Bit Miles would be 500,000,000 bit miles (or 500 megabit miles).

Bit miles for Provider 320 are also measured for each ASB port where Internet traffic was received from Provider 330 and for each PE port where part of that traffic then egresses to a third party, such as the third-party 310. In such instances, bit miles are measured, calculated or otherwise obtained by the product of (i) the amount of traffic bandwidth from that ASB port to that PE port, which may be measured, for example, using the 95$^{th}$ Percentile Method and (ii) the geographical distance between that ASB Port and the PI Point or ASB Port assigned to that PE Port using PE port mapping, which may be obtained, for example, using Great Circle Miles, as described herein.

Bit miles are measured between each relevant location. The total measured bit miles is the sum of all measured bit mile calculations. The bit miles and total bit miles are measured and calculated for Internet traffic carried on each of Provider 320 and Provider 330.

Figure 4:
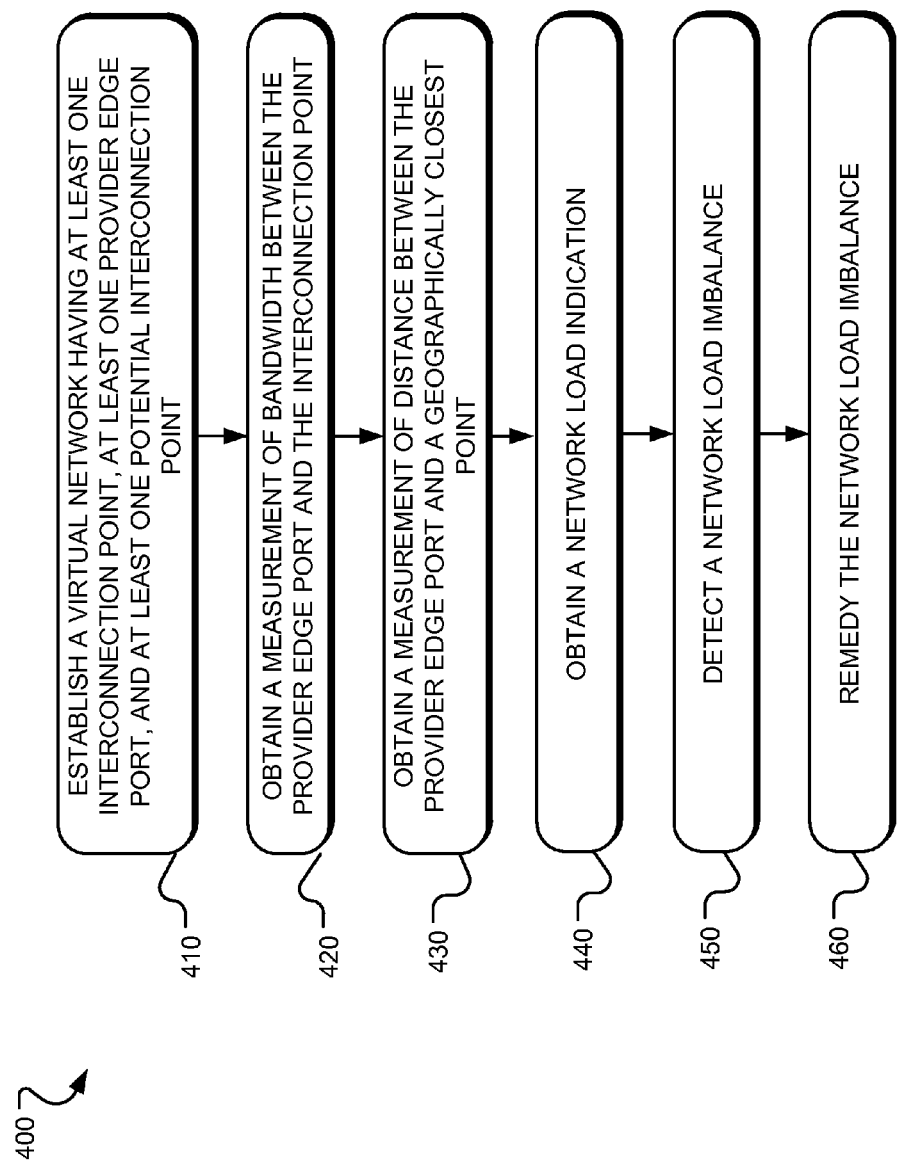
FIG. 4 is a flow chart illustrating example operations for identifying and remedying traffic or other load imbalances between networks.

FIG. 4 is a flow chart illustrating example operations 400 for identifying and remedying traffic or other load imbalances between networks. An establishing operation 410 establishes a virtual network representative of at least a first provider network. The virtual network including at least one interconnection point where network traffic is exchanged between the first provider network and a second provider network. In one implementation, the establishing operation 410 identifies relevant ports as either PE ports or ASB ports and identifies PI points. The virtual network has at least one PE port where the first provider network connects to a third party network and may have one or more PI points where the first provider network may be configured to exchange traffic with the second provider network. The virtuality of the network is imparted through the identification of one or more PI points, among other things.

A bandwidth obtaining operation 420 obtains a measurement of an amount of traffic bandwidth between the interconnection point and the PE port. In one implementation, the bandwidth obtaining operation 420 obtains the measurement using the 95$^{th}$ Percentile Method, as described herein. In other implementations, the bandwidth obtaining operation 420 obtains the measurement using other traffic measurement techniques.

A distance obtaining operation 430 maps the PE port to a geographically closest interconnection point, which may be a PI point or an interconnection point, such as an ASB port. In some cases, the geographically closest interconnection point may be in the same location as the PE port. The distance obtaining operation 430 obtains a measurement of the geographical distance between the at least one interconnection point and the geographically closest interconnection point. In one implementation, the distance obtaining operation 430 obtains the measurement using "Great Circle Miles," as described herein. In other implementations, the distance obtaining operation 430 obtains the measurement using other techniques to measure geographical distance.

A network load obtaining operation 440 obtains a network load indication for the first provider network as a function of the bandwidth measurement obtained in the bandwidth obtaining operation 420 and of the distance measurement obtained in the distance obtaining operation 430. Specifically, the network load obtaining operation 440 obtains a measured bit mile calculation between each relevant location in the first provider network by repeating operations 420 and 430 as necessary. The network load obtaining operation 440 obtains a total measured bit miles, which is the sum of all measured bit mile calculations, for the first provider network.

The operations 410, 420, 430, and 440 may be performed with respect to the second provider network to obtain a network load indication of the second provider network. In one implementation, a detecting operation 450 uses the network load indications to identify load or traffic imbalances between the first and second provider networks, from which the load imbalances may be remedied through network reconfigurations and otherwise. In one example, each network provider measures its bit miles using the operations 410, 420, 430, and 440 and exchanges that data with the other network provider. The detecting operation 450 compares the exchanged bit mile information to identify imbalances according to any number of possible factors. In one particular example, the detecting operation 450 may identify an imbalance if the total measured bit miles for one provider network is less than 70% of the bit miles carried on the other provider network. When the detecting operation 450 identifies an imbalance, a number of remedies may follow.

A remedying operation 460 remedies an imbalance or other inequity, or otherwise provider indication of potential remedies, between the first and second provider networks identified in the detecting operation 450. Generally speaking, various remedies are possible, including altering or augmenting routing practices and/or the location(s) of the interconnection points in a manner that will remedy inequities in total measured bit miles. For example, MEDs may be implemented and/or interconnection points may be placed closer to the origin/destination locations on the other network provider's Internet network, provided that the ports at such new interconnection points are utilized at appropriate levels.

The following describes several operations that may be implemented, alone or in combination with the other operations, and in any particular order, to remedy bit mile inequities. In the event that during any measurement period (e.g., a calendar quarter) the measured bit miles carried on the second provider network are less than a percentage (e.g., 70%) of the measured bit miles carried on the first provider network and the first provider network was using first-exit routing for all relevant traffic, then the first provider network may invoke a remedy to the inequity, in one particular and possible implementation conforming with various aspects of the present disclosure. First-exit routing, for example, is the routing by a network provider of Internet traffic to the closest interconnection point from where such Internet traffic ingresses that network provider's Internet network.

As described below, there are several possible remedies, including payments, advertising new MEDs and interconnecting in response at existing interconnection points, and interconnecting at a point that was defined in the virtual network as a PI point. These remedies may be used alone or in combination and may include other remedies, as well.

When the detecting operation 450 detects or otherwise discovers an imbalance or inequity, the remedying operation 460 may remedy the imbalance or inequity by providing indication of a remuneration that is a function of the network load indications. As an example, the second provider network, carrying less than 70% of the bit miles of the first provider network, may account for the difference through remuneration, which may be electronic, to the first provider network. In one implementation, the remuneration is defined in terms of a fee that may be calculated by multiplying a value (e.g., 2) by the number of total measured bit miles that would be required to reach 70% of the total measured bit miles carried on the first provider network. As an example only, if the total measured bit miles for the first provider network is 1 million and the total measured bit miles for the second provider network is 500,000, the second provider network transmits or otherwise provides a fee, which may be calculated monthly, in the amount of $400,000 (200,000 Bit Miles needed to reach the 70% threshold, multiplied by value of 2). The payment may be electronic and determined and invoiced automatically or may be a more conventional transaction where the first network provider sends and invoice to the second network provider and payment is made.

In an alternative, when the detecting operation 450 detects or otherwise discovers an imbalance or inequity, the remedying operation 460 may remedy the imbalance or inequity by advertising MEDs and interconnecting according to the advertised MEDs until a threshold balance is met or MEDs are used at all interconnections. For example, the first network provider, carrying the greater of the bit mile imbalance, may advertise, to the second network provider, MEDs at all interconnection points on its Internet network. The second provider network is configured to accept MEDs at any or all of the then current interconnection points as necessary to remedy the bit mile imbalance. Following the implementation of MEDs, each provider network monitors the flow of Internet traffic to determine whether, over some period of time, the total measured bit miles carried on the second provider network is still less than some percentage (e.g., 70%) of the total measured bit miles carried on the first provider network. This may be repeated until the bit mile inequity is remedied or until the second provider network has accepted MEDs at all of the then current interconnection points, in one example.

Figure 5A:
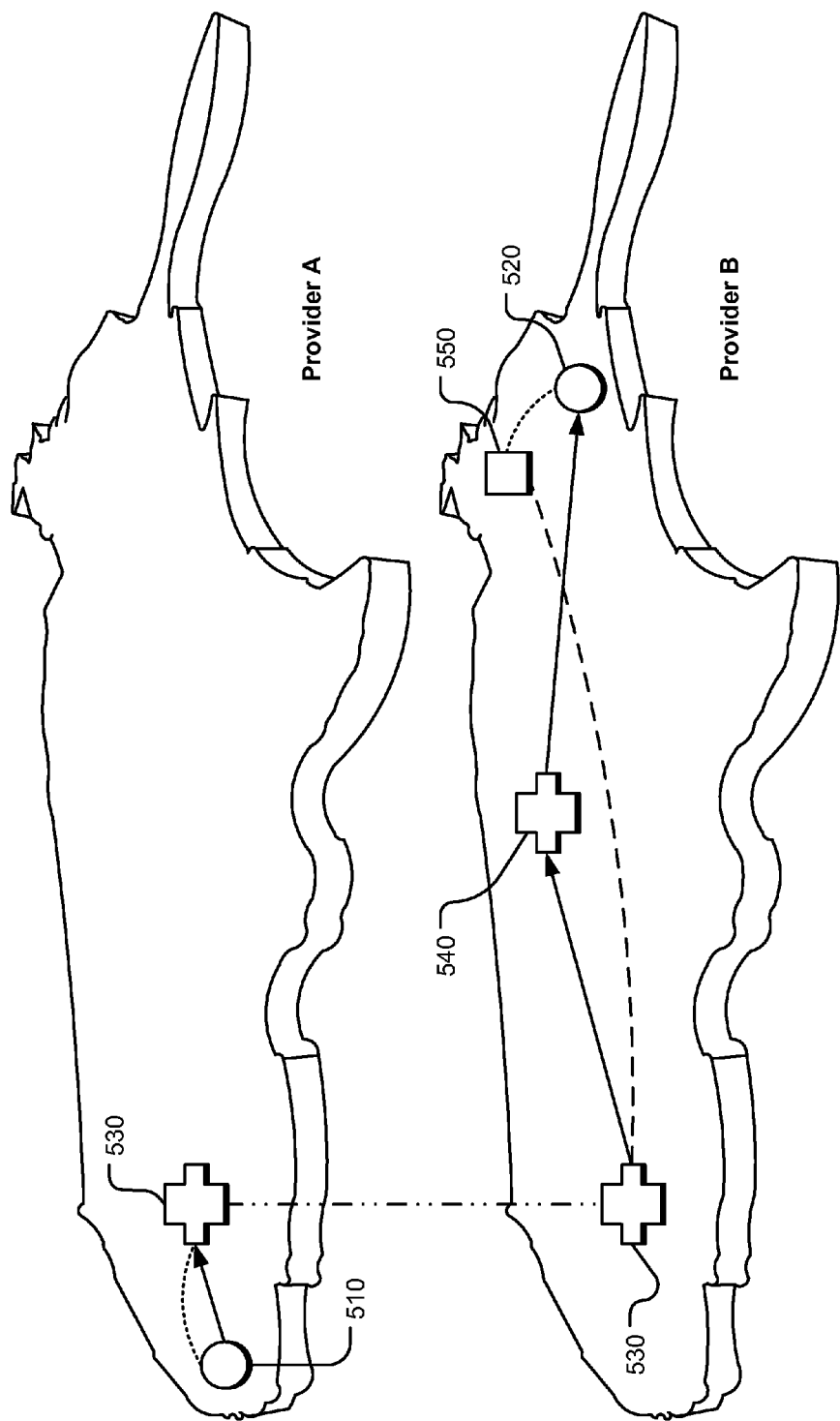

An example of this remedy is illustrated in FIGS. 5A and 5B, which shows a load imbalance and balance, respectively, between Provider A and Provider B. The arrows in FIGS. 5A and 5B represent the path traveled by the network traffic, the dotted lines represent PE port mapping, the large broken line represents distance that is measured for the bit mile calculation, and the broken, dotted line represents the interconnection point between Provider A and Provider B. As shown in FIG. 5A, Provider B carries the bit mile burden. Provider A receives traffic from a third-party on the west coast at a PE port 510 and hands the traffic to Provider B at ASB port 530. Provider B then carries the traffic to the east coast via ASB port 540 and PI point 550 to PE port 520. To remedy the imbalance, Provider B may advertise MEDs to change the ASB port that is used as an interconnection, thereby shifting bit miles to Provider A. As shown in FIG. 5B, once MEDs are implemented, ASB port 560, which may be the same or different than the ASB port 540, is used as an interconnection. Provider A carries the traffic through ASB port 530 to ASB port 560, where Provider A hands the traffic to Provider B, who then carries the traffic to the east coast via ASB port 540 and PI point 550 to PE port 520. Accordingly, as shown in FIG. 5B, once the MEDs are implemented, the bit miles are roughly balanced between Provider A and Provider B.

If, after the implementation of MEDs, as set forth above, the total measured bit miles carried on the second provider network are still less than some percentage (e.g. 70%) of the total measured bit miles carried on the first provider network, then the remedying operation 460 may allow additional interconnection points by the second provider network. The new interconnection points will be at existing PI points.

In one implementation, the selection of the new interconnection points may be prioritized based on a combination of traffic and distance. The PI points in the first provider network will be ranked, highest to lowest, based on the measured bit miles of some time earlier, such as a period of time immediately preceding the determination of the inequity. In one example, the first provider network will identify PI points that allow the second provider network to alleviate some percentage, e.g., at least 200%, of the amount of measured bit miles the second network provider would need to add to its network so that it is carrying at least the threshold percentage, e.g., 70%, of the total measured bit miles as are carried on the first provider network. All such PI points may be available as additional interconnection points. The second network provider may establish an interconnection at any of the PI points. In conjunction, the first and second network providers will implement MEDs at these new interconnection points, as necessary to correct the inequity. Generally speaking, the first provider network will advertise MEDs and the second provider network will honor MEDs.

To prevent gaming and otherwise ensure proper management of the networks, when the provider network carrying more total measured bit miles chooses not to allow deeper interconnections, such as through providing access at PI points, some or all of the measured bit miles involving the PI point refused as an interconnection point may be excluded from the total measured bit mile measurements going forward until such interconnection point is allowed and implemented. In such event, the first and second network providers reassess the effect of the removal of such traffic from the total measured bit mile calculations, and if the total measured bit miles carried on the second provider network are still less than the established threshold (e.g., 70%) of the total measured bit miles carried on the first provider network, then some or all of the inequity remedies set out herein may be implemented.

Figure 6B:
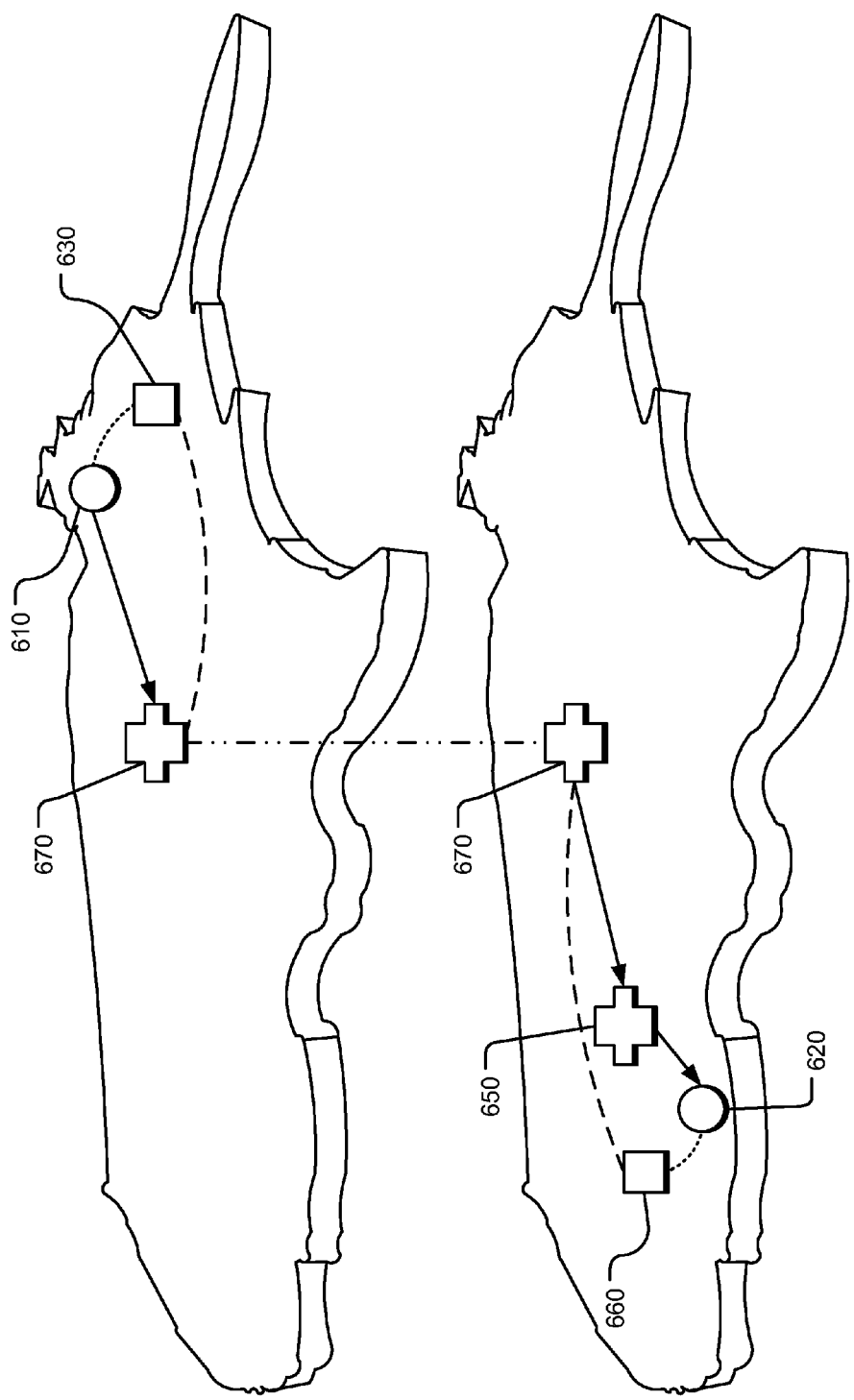

An example of implementation interconnecting two providers at a mutual PI point to remedy a load imbalance between the providers is illustrated in FIGS. 6A and 6B, which shows a load imbalance and balance, respectively, between Provider A and Provider B. The arrows in FIGS. 6A and 6B represent the path traveled by the network traffic, the dotted lines represent PE port mapping, the large broken line represents distance that is measured for the bit mile calculation, and the broken, dotted line represents the interconnection point between Provider A and Provider B. As shown in FIG. 6A, Provider A carries the bit mile burden. Provider A receives traffic from a third-party on the east coast at a PE port 610 and carries the traffic via PI points 630 and 640 to ASB port 650, where Provider A hands the traffic to Provider B. Provider B then carries the traffic a short distance via PI point 660 to PE port 620. To remedy the imbalance, Provider A and Provider B may interconnect at a mutual PI point 670, thereby shifting bit miles to Provider B. As shown in FIG. 6B, once Provider A and Provider B interconnect at the mutual PI point 670, the bit miles are roughly balanced between Provider A and Provider B. Provider A carries the traffic through to ASB port 670, where Provider A hands the traffic to Provider B, who then carries the traffic to PE port 620 via ASB ports 650 and 670 and PI point 660.

If after the various steps set out herein failure to remedy the bit mile inequity, then some additional remedy may be possible. In a simple example, the second network provider may provide remuneration to the first network provider in accordance with various possibilities, including those set out above.

Additional practical actions may be required by either network provider to fully realize the resolution of inequities. For example, if an interconnection point is owned or controlled by one network provider but is not on-net to the other network provider, then the owning or controlling provider should allow the interconnection point to be y) placed on net by the other provider (i.e., by allowing them to access the location via fiber or other connectivity), or z) accessed via lit services provided by the owning or controlling provider or (ii) ensure that the interconnection point is served on-net by other competitive providers of communications service.

For a detailed description of the visualization and modeling tool, reference is made to FIGS. 7-13. As can be understood from FIGS. 7-13, the visualization and modeling tool enables a user to model interconnection relationships between a provider network and a partner, which may also be a provider network. In one implementation, the visualization and modeling tool has access to and utilizes the information discussed with respect to FIGS. 3-6B. Using the visualization and modeling tool, the user may visualize or otherwise assess the impact of at least one interconnection point on the exchange of network traffic between the provider network and the partner. For example, the impact of creating a new interconnection point, interconnecting deeper in another provider network, or otherwise altering an interconnection relationship may be modeled. Further, the visualization and modeling tool may be used to define possible network load imbalance remedies and model the remedies before physical implementation to visualize the impact of the remedies on the balance of network traffic exchanged between provider networks.

FIGS. 7-12 show an example user interface 700 through which access to and interactions with bit mile data are controlled and other actions are taken with the visualization and modeling tool. It will be appreciated by those skilled in the art that such depictions are exemplary only and not intended to be limiting.

Figure 7:
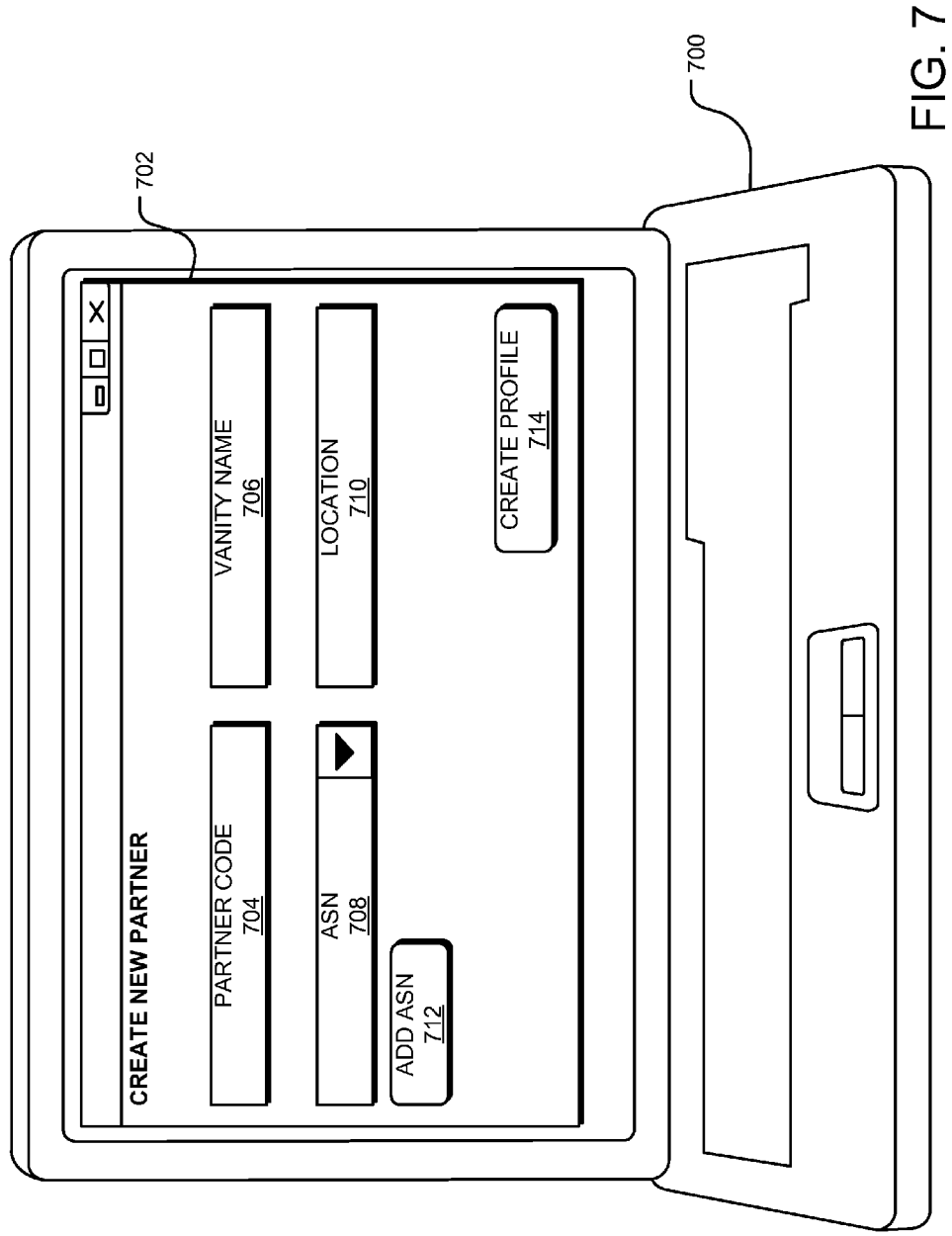
FIG. 7 shows an example user interface for defining a partner profile for a partner of a provider network.

Turning to FIG. 7, the user interface 700 shows a partner profile 702 for defining a partner of a provider network. In one implementation, the partner is another provider network. As shown in FIG. 7, in one implementation, the partner profile 702 includes a partner code field 704, a vanity name field 706, an ASN field 708, and a location field 710.

The partner profile 702 is defined by at least one autonomous system number (ASN) in the ASN field 708. Generally, an ASN represents a network on the Internet. Partners may have between one and several ASNs. As such, the partner profile 702 may include an add ASN button 712 for inputting addition ASNs associated with the partner. In one implementation, the ASN identified in the ASN field 708 is associated with an ASN corresponding to an actual or proposed interconnection for the exchange of traffic with the partner. The location of the ASN may be input in the location field 710. A partner code and the name of the partner may be input into the partner code field 704 and the vanity name field 706, respectively. Once the information relating to the partner is input, a create profile button 714 may be selected to save the partner profile information.

Figure 8:
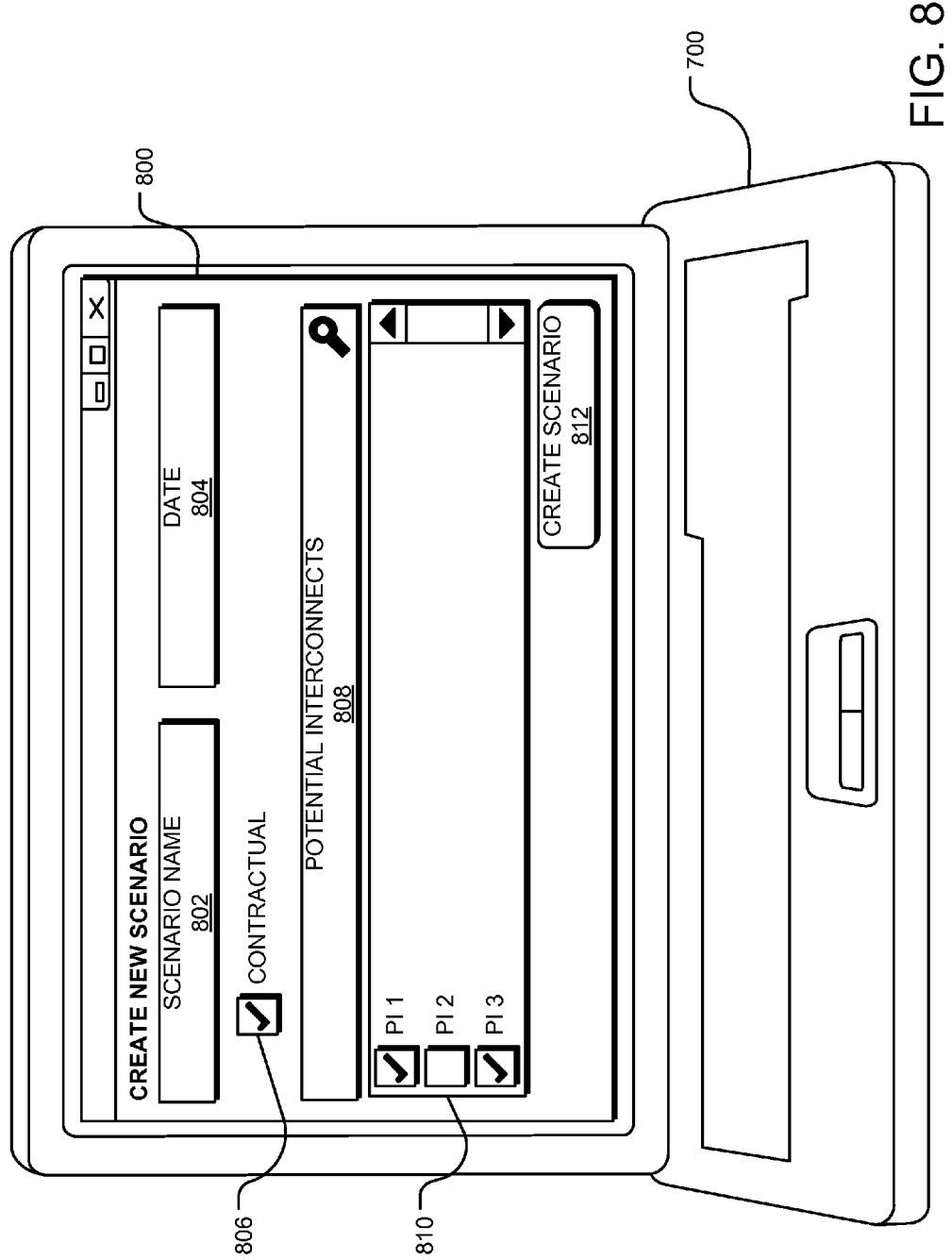
FIG. 8 illustrates the user interface for defining potential interconnection points between provider networks to generate traffic projections based upon the defined potential interconnections.

For an identified partner, as shown in FIG. 8, the visualization and modeling tool allows a user to generate or otherwise model possible bit mile scenarios and then visualize the impact of such scenarios. Referring to FIG. 8, a new scenario 800 is defined using the user interface 700.

In one implementation, the new scenario 800 includes a scenario name field 802 and a date field 804. A name may be assigned to the new scenario 800 using the scenario name field 802. The date(s) input into the date field 804 may reflect, for example, a start date and an end date, which may be a historical date range, a current date range, or a future date range. Using an indicator 806, the dates may be associated with a contract with the partner.

The data fields in the new scenario 800 may be used to define a model (e.g., a bit mile model) based on the date range and one or more PI points. A user may search for potential interconnection points using a search box 808. As discussed herein, a PI point may be an existing interconnection or a point for a new interconnection. Further, the PI point may be associated with a geographic location. For example, the PI point may represent a location where the provider network will connect with the partner network to exchange network traffic.

In one implementation, more than one PI point may be defined, for example, by selecting PI points using the window 810. By defining more than one PI point, comparative results may be generated, for example, in the form of data, graphs, charts, bit mile calculations, traffic balance projections, and the various raw data used in any such calculations as well as any other information useful in understanding the traffic and other effects of any potential interconnect may be shown. Once the new scenario 800 is defined, a create scenario button 812 may be selected to save the data and generate the results.

Figure 9:
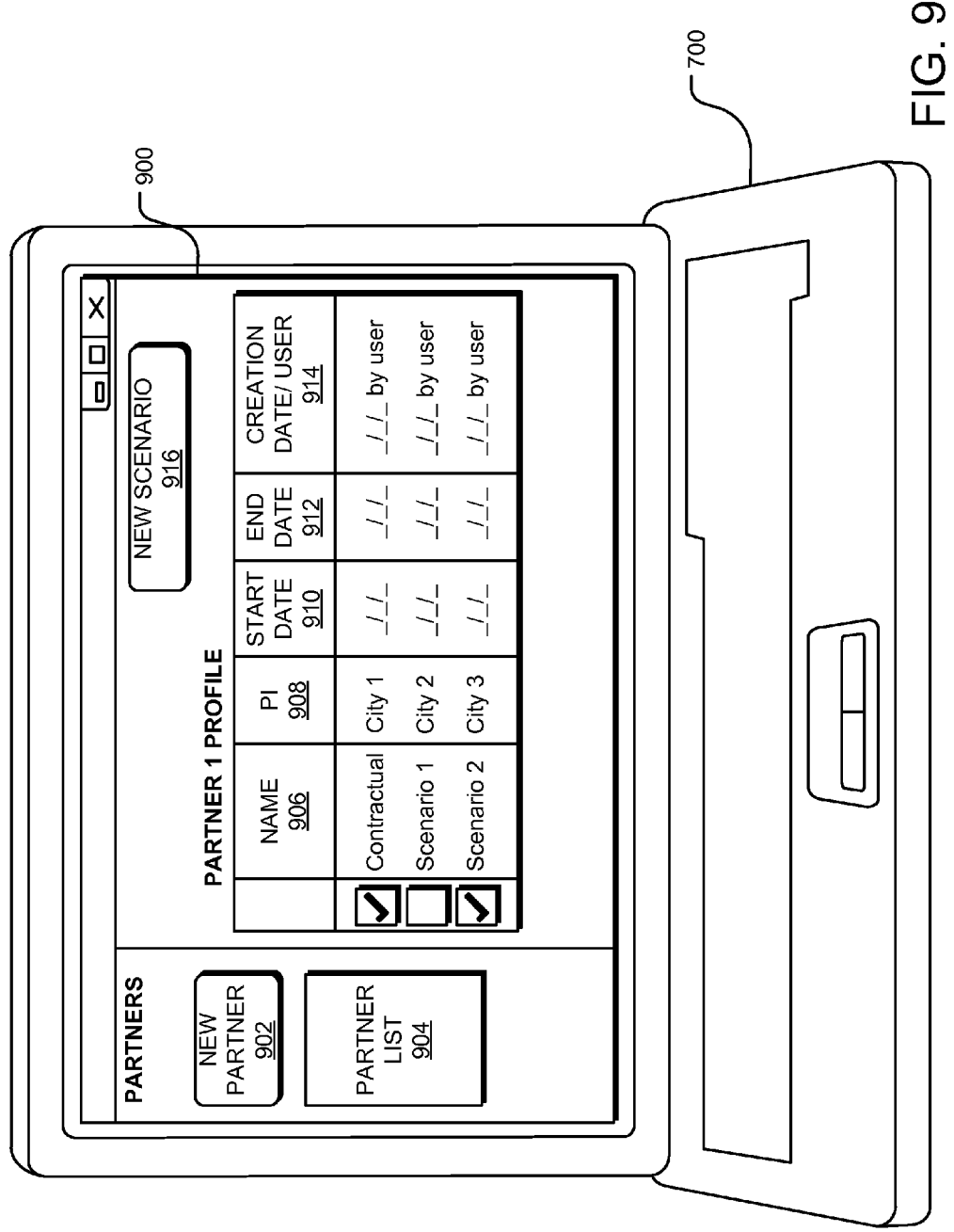
FIG. 9 shows the user interface for identifying a partner for connecting at a potential interconnection point such that the traffic projection is based upon the identified potential interconnection point and the identified partner.

FIG. 9 illustrates the user interface 700 showing an identified partner profile 900. In one implementation, the identified partner profile 900 is used for identifying a partner for connecting at a potential interconnection point such that a traffic projection is based upon the identified potential interconnection point and the identified partner. Stated differently, in one implementation, the identified partner profile 900 is used to identify a PI point associated with an identified partner. The partner may be identified using the partner profile 702.

In one implementation, a new partner may be added using a new partner button 902. Once added, the partner will appear in a partner list 904, which lists the partners of the provider network. Selecting or otherwise identifying one of the partners from the partner list 904 shows the identified partner profile 900 for the selected partner. In one implementation, the identified partner profile 900 lists: a name 906 of the scenarios, including PI points, associated with the identified partner; a PI location 908; a start date 910; and end date 912; and creation information 914, including a user and a creation date. The scenarios may be associated with a contract with the partner. The identified partner profile 900 may further include a new scenario button 916 for adding a new scenario to the identified partner profile 900.

PI points associated with the identified partner may be selected or otherwise identified from the identified partner profile 900 for modeling. Once one or more PI points are identified from the identified partner profile 900, network traffic projections and associated information will be modeled and visualized for the identified PI point(s) and partner, thereby helping to optimize any bit-mile partnering interconnection.

Figure 10:
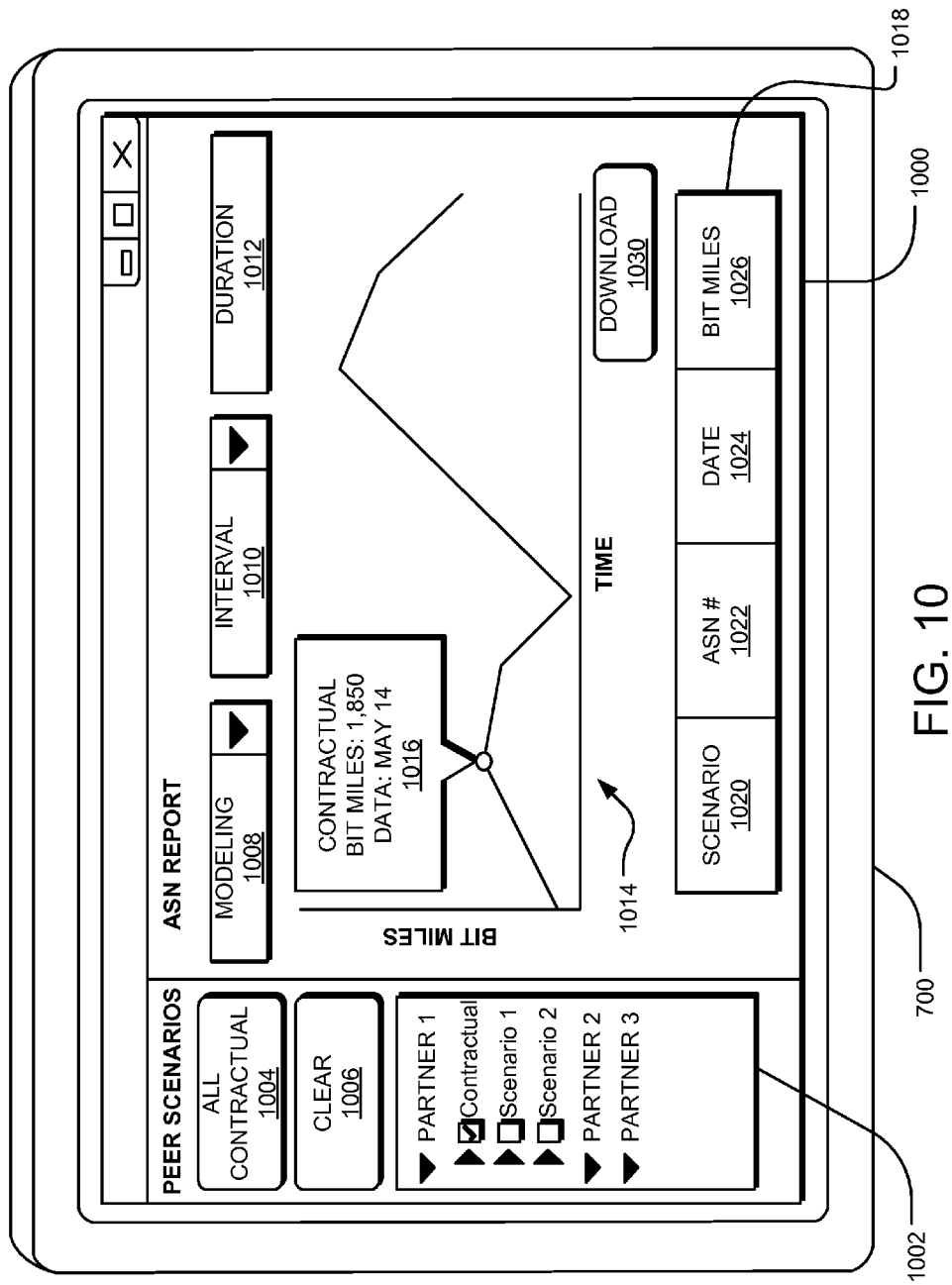
FIG. 10 is the user interface showing a graphical representation of the result of generating a traffic projection for a potential interconnection and partner.

Turning to FIG. 10, the user interface 700 shows a graphical representation of the result of generating a traffic projection for a potential interconnection and partner. Stated differently, an ASN report 1000 shows one example output for visualizing a modeled connection between the provider network and the identified partner network at a PI point.

In one implementation, a peer scenario list 1002 lists each of the partners of the provider network and the scenarios associated with those partners. From the peer scenario list 1002, one or more scenarios may be selected or otherwise identified for modeling. Once selected, an all contractual button 1004 selects all scenarios with which a contract is associated. A clear button 1006 clears any selections.

Selection of at least one scenario using the peer scenario list 1002, the identified partner profile 900, or other means, models an interconnection relationship based on the identified scenario(s). Parameters of the modeling may be defined using, without limitation, a modeling field 1008, an interval field 1010, and a duration field 1012. The modeling field 1008 defines the standard or calculation to be modeled. For example, the modeling may be defined as bit miles modeling using the modeling field 1008. The interval field 1010 sets the interval for which data will be presented. For example, the interval may be days, weeks, months, years, or some other interval. The duration field 1012 sets a start date and an end date or otherwise sets a time range for modeling.

A visual representation 1014 of the model is shown in the ASN report 1000. In the example shown in FIG. 10, the visual representation 1014 is a graphical representation of bit mile data for at least one identified PI point for an identified partner. In this example, it can be seen that the graphed bit mile calculation changes over time (y-axis=bit miles, x axis=time). A user can select portions of the bit mile graph, and once selected, a window 1016 pops up providing information regarding the selected portion of the bit mile graph. For example, the window 1016 may indicate the name of the scenario, whether the scenario is contractual, the date corresponding to the data, and the bit miles associated with the date. A table 1018 may list the data depicted in the visual representation 1014. In one implementation, the table 1018 lists the scenario name 1020, the ASN 1022, the date 1024 corresponding to the data, and the bit mile 1026 associated with the date 1024 and the ASN 1022. A row in the table 1018 or a portion of the visual representation 1014 may be selected and a download button 1030 selected to obtain raw data associated with the visual representation 1014.

Figure 11:
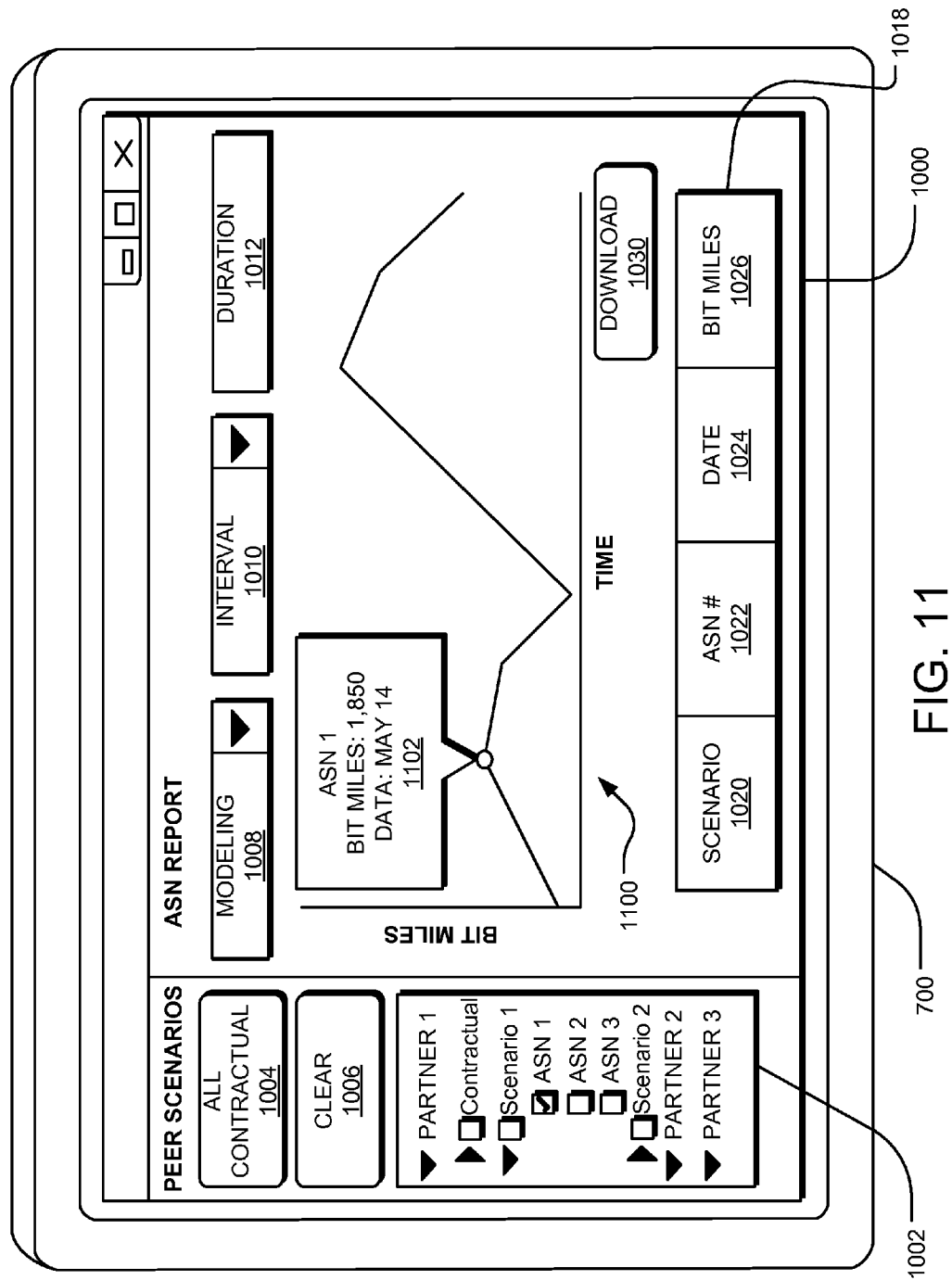
FIG. 11 is the user interface depicting a graphical representation of bit mile data for individual autonomous system numbers associated with a particular partner scenario.

FIG. 11 is the user interface 700 depicting a visual representation 1100 of bit mile data for individual ASN associated with a particular partner scenario. In the example shown in FIG. 11, a particular ASN is identified for modeling. Stated differently, FIG. 11 shows an example visualization of a modeled interconnection between the provider network and the partner.

In the example shown in FIG. 11, the visual representation 1100 is a graphical representation of bit mile data for at least one ASN. Like the visual representation 1014 shown in FIG. 10, portions of the bit mile graph may be selected to prompt a window 1102 to provide information regarding the selected portion of the bit mile graph. For example, the window 1102 may indicate the ASN, the date corresponding to the data, and the bit miles associated with the date. A table 1018 may list the data depicted in the visual representation 1100. In one implementation, the table 1018 lists the scenario name 1020, each associated with the identified partner, the ASN 1022, the date 1024 corresponding to the data, and the bit mile 1026 associated with the date 1024 and the ASN 1022. A row in the table 1018 or a portion of the visual representation 1100 may be selected and the download button 1030 selected to obtain raw data associated with the visual representation 1100.

Figure 12:
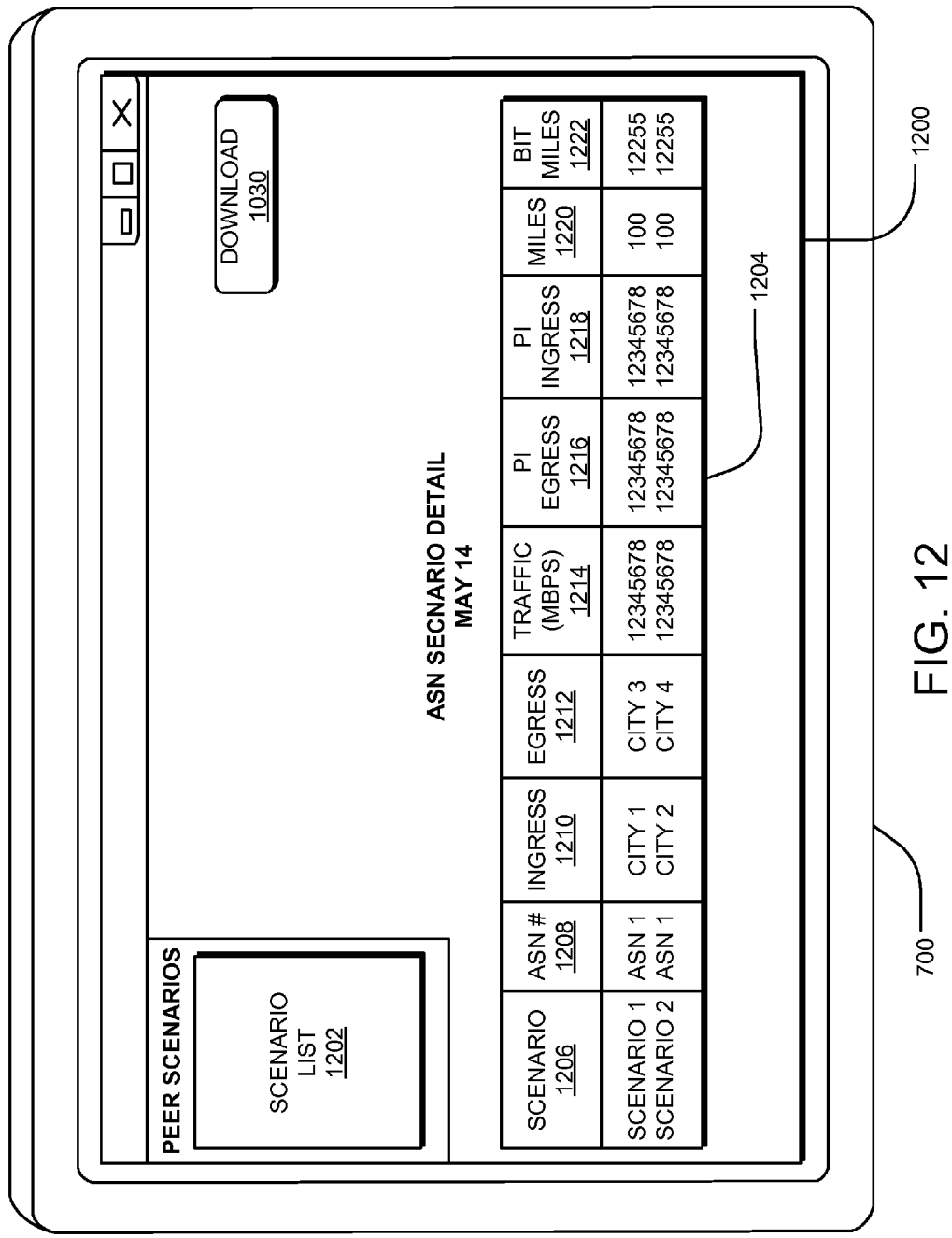
FIG. 12 is the user interface showing a snapshot of raw data used to obtain the traffic projection scenarios of FIGS. 8 and 9.

FIG. 12 shows the user interface 700 depicting a snapshot 1200 of raw data used to obtain the traffic projection scenarios of FIGS. 10 and 11. Stated differently, the snapshot 1200 provides raw data associated with a modeled interconnection relationship.

In one implementation, by selecting a particular row associated with the visual representation 1014 or 1100 or selecting a scenario from a scenario list 1202, the raw data used in creating the visual representation 1014 or 1100 is displayed. The raw data may be displayed in a table 1204 and include a scenario type 1206 (e.g., contractual), ASN 1208, an ingress location 1210, an egress location 1212, traffic 1214, a PI egress 1216, a PI ingress 1218, distance 1220, and calculated bit miles 1222. The download button 1030 may be used to download the data into a file, such as an .xls or .csv file, so that the information might be shared, such as with the partner associated with the modeled interconnect.

In one implementation, the table 1204 further includes date(s). The date fields may be used to identify historical bit-mile relationships. Thus, besides modeling possible interconnection scenarios, the tool also allows the user to assess current or historical interconnections. In a traditional peering relationship, each partner knows the amount traffic exchanged. Provider networks, however, may not know the path of data within a partner network and therefore do not know the distance carried. By sharing the modeling visualization information and/or the raw data, partners and provider networks can optimize their interconnection relationships. It is also possible to also establish a standard deviation in distance carried and account for such predictable deviation.

For a partner network or the provider network, the system can access and obtain bit mile calculations as well as model, visualize, and/or estimate (for a partner network) identified partner egress gateways, hand-off locations to the partner network, physical addresses of partner PIs, hand-off locations in any form, ingress and egress locations, PE locations, PI locations (including PI ingress and egress locations), ASP locations, and latitude and longitude measurements of certain components of the network (e.g., the PI's). These estimations may be based upon information, including, without limitation, BGP routing tables, communities for a partner's network, and address locations of certain components of the network. Often the path within the partner network is not visible, shortest path, or symmetrical and thus bit miles of a partner cannot be accurately assessed. However, with some or all of the information set out above, partner bit mile estimates may be made. Thus, it is possible to estimate whether the bit-mile burden between two providers is roughly equal. It is also possible for a partner to utilize the tool to model and visualize bit mile interconnections (bit mile burden for the provider network and the partner's provider network) and share its calculations.

Figure 13:
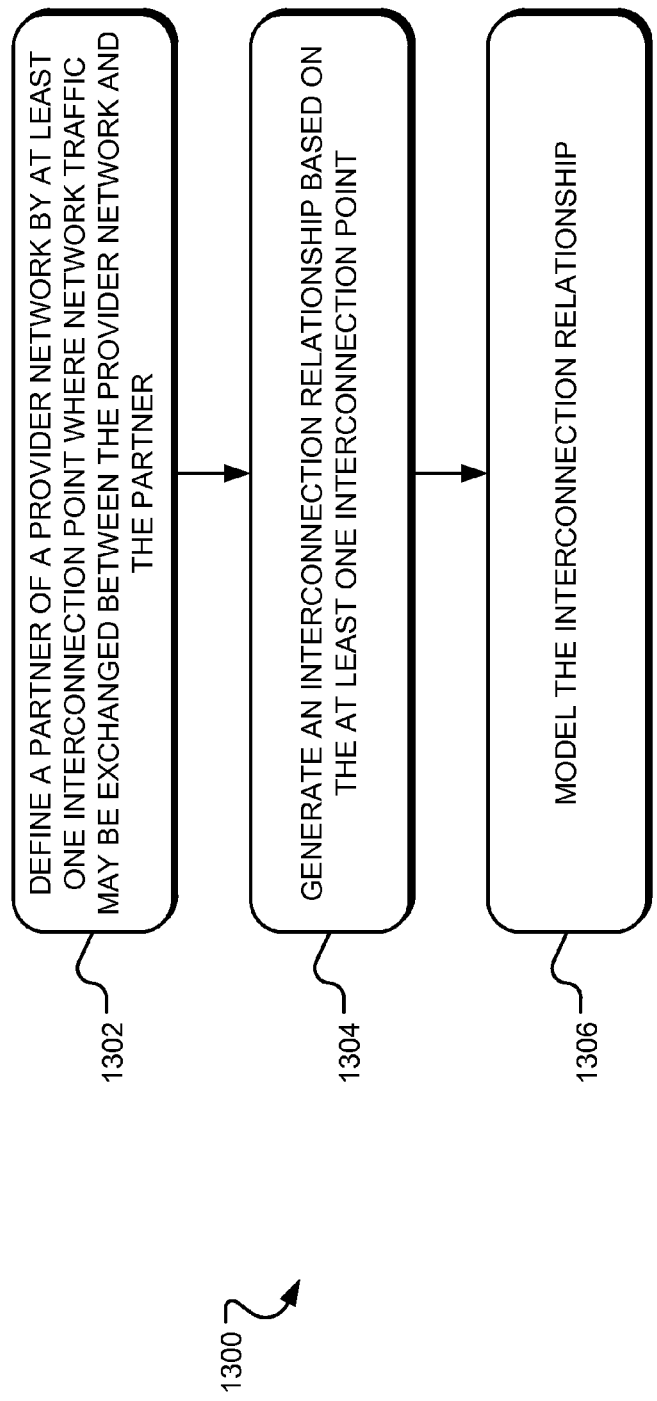
FIG. 13 is a flow chart illustrating example operations for visualizing and modeling an interconnection relationship of a provider network and at least one partner.

Referring to FIG. 13, example operations 1300 for visualizing and modeling an interconnection relationship of a provider network and at least one partner are shown. In one implementation, a defining operation 1302 defines a partner of a provider network by at least one interconnection point where network traffic may be exchanged between the provider network and the partner. The interconnection point may be existing or new and may be associated with a geographical location. An ASN may be associated with the interconnection point. Further, the interconnection point may be associated with a contract with the partner.

A generating operation 1304 generates an interconnection relationship based on the at least one interconnection point. The interconnection relationship may be a connection between the provider network and the partner at a PI point. A modeling operation 1306 models the interconnection relationship to visualize the impact of the at least one interconnection point. The modeling may include a network load indication for the provider network as a function of a bandwidth measurement and a distance measurement. Stated differently, the modeling may be a bit mile model for the provider network based on the interconnection point. The model may provide a traffic balance projection of the network traffic exchanged between the provider network and the partner based on the interconnection point. Further, remedies for a traffic imbalance or inequity may be modeled before being physically implemented.

Figure 14:
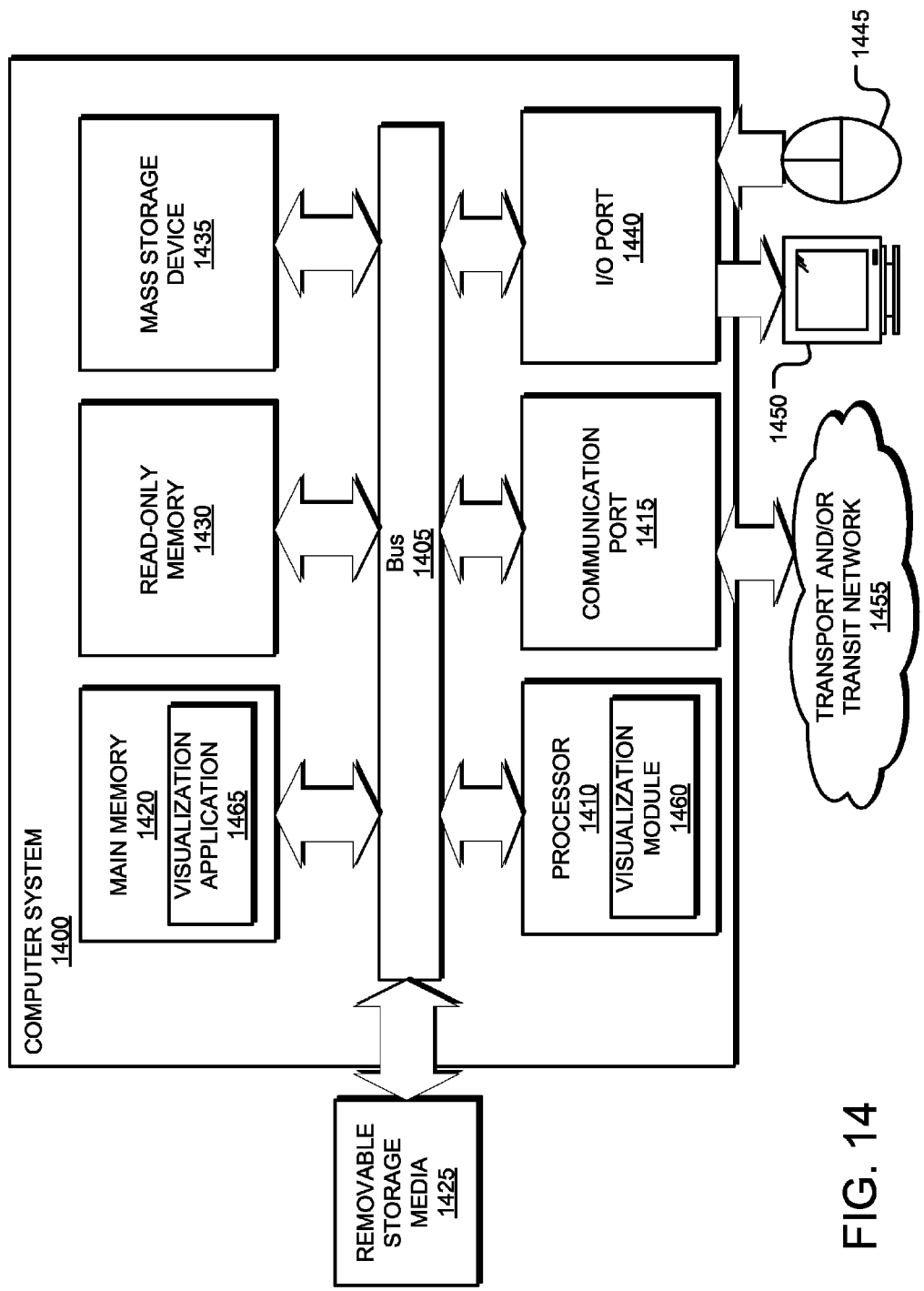
FIG. 14 is an example computing system that may implement various systems and methods discussed herein.

FIG. 14 is an example computing system 1400 that may implement various systems and methods discussed herein. The computer system 1400 includes one or more processors 1410. The processor 1410 may include one or more internal levels of cache (not shown) and a bus controller or bus interface unit to direct interaction with the processor bus 1405. The processor 1410 may include a visualization module 1460 that specifically implements the various methods discussed herein. The main memory 1420 may include one or more memory cards and a control circuit (not shown), or other forms of removable memory, and may store a visualization application 1465 including computer executable instructions, that when run on the processor, implement the methods and system set out herein. Other forms of memory, such as a mass storage device 1435, a read only memory 1430, and a removable storage memory 1425, may also be included and accessible, by the processor (or processors) 1410 via the bus 1405. The computing system 1400 may further include a database of information used for visualization and modeling of bit mile scenarios.

The computer system 1400 may further include a communication port 1415 connected to a transport and/or transit network 1455 by way of which the computer system 1400 may receive network data useful in executing the methods and system set out herein as well as transmitting information and network configuration changes determined thereby. The computer system 1400 may include an I/O device 1440, or other device, by which information is displayed, such as at display screen 1450, or information is input, such as input device 1445. The input device 1445 may be alphanumeric input device, including alphanumeric and other keys for communicating information and/or command selections to the processor. The input device 1445 may be another type of user input device including cursor control, such as a mouse, a trackball, or cursor direction keys for communicating direction information and command selections to the processors 1410 and for controlling cursor movement on the display device 1450. In the case of a tablet device, the input may be through a touch screen, voice commands, and/or Bluetooth connected keyboard, among other input mechanisms. The system set forth in FIG. 14 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
by a processor coupled to a memory, wherein the processor is configured to execute instructions stored on the memory, the instructions comprising the steps of:
defining a partner of a provider network by at least one interconnection point where network traffic is capable of being exchanged between the provider network and the partner;
generating an interconnection relationship between the provider network and the partner based on the at least one interconnection point;

generating a traffic balance projection between the provider network and the partner based on the interconnection relationship;

modeling a traffic balance projection scenario, the traffic balance projection scenario depending on one or more potential interconnection points where network traffic is capable of being exchanged between the provider network and the partner, the one or more potential interconnection points altering the interconnection relationship between the provider network and the partner; and outputting a report of the modeled traffic balance projection scenario.

2. The method of claim 1, wherein at least one of the one or more potential interconnection points is an existing interconnection point where network traffic is exchanged between the provider network and the partner.

3. The method of claim 1, wherein the potential interconnection point is restricted to a location not closer than a specified distance to another potential interconnection point or an existing interconnection point in the provider network.

4. The method of claim 3, wherein the specified distance is 50 miles.

5. The method of claim 1, wherein the at least one interconnection point is associated with an autonomous system number.

6. The method of claim 1, wherein the at least one potential interconnection point is associated with a geographical location.

7. The method of claim 1, wherein the at least one potential interconnection point is associated with a contract with the partner.

8. The method of claim 1, wherein the modeled traffic balance projection scenario includes a network load indication for the provider network as a function of a bandwidth measurement and a distance measurement of traffic carried.

9. The method of claim 8, wherein the provider network includes at least one provider edge port where the provider network connects to a third party network, the bandwidth measurement being based on a measurement of a bandwidth between the at least one provider edge port and the at least one interconnection point and the distance measurement being based on a measurement of a distance between the at least one provider edge port and a geographically closest point, the geographically closest point being the closest in geographical distance to the at least one provider edge port of either the at least one interconnection point or an assigned interconnection point.

10. The method of claim 1, wherein the modeled traffic balance projection scenario includes a potential remedy for a load imbalance between the provider network and the partner.

11. A non-transitory computer-readable storage media storing computer-executable instructions for performing a computer process on a computing system, the computer process comprising:

defining a partner of a provider network by at least one interconnection point where network traffic is capable of being exchanged between the provider network and the partner;

generating an interconnection relationship between the provider network and the partner based on the at least one interconnection point;

generating a traffic balance projection between the provider network and the partner based on the interconnection relationship;

modeling a traffic balance projection scenario, the traffic balance projection scenario depending on one or more potential interconnection points where network traffic is capable of being exchanged between the provider network and the partner, the one or more potential interconnection points altering the interconnection relationship between the provider network and the partner; and outputting a report of the modeled traffic balance projection scenario.

12. The non-transitory computer-readable storage media of claim 11, wherein the modeled traffic balance projection scenario includes a network load indication for the provider network as a function of a bandwidth measurement and a distance measurement of traffic carried.

13. The non-transitory computer-readable storage media of claim 12, wherein the provider network includes at least one provider edge port where the provider network connects to a third party network, the bandwidth measurement being based on a measurement of a bandwidth between the at least one provider edge port and the at least one interconnection point and the distance measurement being based on a measurement of a distance between the at least one provider edge port and a geographically closest point, the geographically closest point being the closest in geographical distance to the at least one provider edge port of either the at least one interconnection point or an assigned interconnection point.

14. The non-transitory computer-readable storage media of claim 11, wherein the modeled traffic balance projection scenario includes a potential remedy for a load imbalance between the provider network and the partner.

15. A system comprising:

a processor coupled to a memory, wherein the processor is configured to execute instructions stored on the memory;

a visualization module stored as instructions on the memory and executable by the processor, wherein the visualization module is configured to:

define a partner of a provider network by at least one interconnection point where network traffic is capable of being exchanged between the provider network and the partner;

generate an interconnection relationship between the provider network and the partner based on the at least one interconnection point;

generate a traffic balance projection between the provider network and the partner based on the interconnection relationship;

model a traffic balance projection scenario, the traffic balance projection scenario depending on one or more potential interconnection points where network traffic is capable of being exchanged between a partner and a provider network, the partner being defined by at least one interconnection point where network traffic is capable of being exchanged between the provider network and the partner, the one or more potential interconnection points altering the interconnection relationship between the provider network and the partner; and output a report of the modeled traffic balance projection scenario.

16. The system of claim 15, wherein the model includes a potential remedy for a load imbalance between the provider network and the partner.

* * * * *